(12) United States Patent
Fukushima et al.

(10) Patent No.: US 7,689,591 B2
(45) Date of Patent: Mar. 30, 2010

(54) RECORDING APPARATUS AND METHOD, REPRODUCING APPARATUS AND METHOD, RECORDING AND REPRODUCING APPARATUS AND METHOD, AND PROGRAM

(75) Inventors: Seigo Fukushima, Kanagawa (JP); Makoto Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 291 days.

(21) Appl. No.: 11/194,681

(22) Filed: Aug. 2, 2005

(65) Prior Publication Data
US 2006/0036571 A1 Feb. 16, 2006

(30) Foreign Application Priority Data
Aug. 4, 2004 (JP) ............................ P2004-227541

(51) Int. Cl.
G06F 17/00 (2006.01)
(52) U.S. Cl. ...................... 707/104.1; 707/100; 707/101
(58) Field of Classification Search ........................ None
See application file for complete search history.

(56) References Cited

U.S. PATENT DOCUMENTS

| | | | |
|---|---|---|---|
| 6,285,793 B1 * | 9/2001 | Hua ............................ | 382/239 |
| 6,360,057 B1 * | 3/2002 | Tsumagari et al. ............ | 386/95 |
| 6,369,835 B1 * | 4/2002 | Lin ............................. | 715/726 |
| 7,046,805 B2 * | 5/2006 | Fitzhardinge et al. ....... | 380/212 |
| 7,146,627 B1 * | 12/2006 | Ismail et al. ................... | 725/47 |
| 7,212,731 B1 * | 5/2007 | Morotomi et al. ............. | 386/95 |
| 2001/0056434 A1 * | 12/2001 | Kaplan et al. ............ | 707/104.1 |
| 2002/0071654 A1 * | 6/2002 | Notoya et al. ................... | 386/65 |
| 2002/0156852 A1 * | 10/2002 | Hughes et al. .............. | 709/206 |
| 2002/0184628 A1 * | 12/2002 | Kim et al. ..................... | 725/41 |
| 2003/0182266 A1 * | 9/2003 | Stern ............................. | 707/1 |
| 2003/0202773 A1 * | 10/2003 | Dow et al. ..................... | 386/46 |

(Continued)

FOREIGN PATENT DOCUMENTS

EP 1781030 A1 * 5/2007

(Continued)

OTHER PUBLICATIONS

Goularte et al., "Structuring Interactive TV Documents", Nov. 20, 2003, DocEng '03, ACM Press, p. 42-51.*

(Continued)

*Primary Examiner*—Khanh B Pham
(74) *Attorney, Agent, or Firm*—Finnegan, Henderson, Farabow, Garrett & Dunner, L.L.P.

(57) ABSTRACT

Disclosed is a recording apparatus for editing data and recording a file which is an editing result. The apparatus is configured by a file generating section for generating a file and a recording section for recording the file which is generated by the file generating section, in a recording medium. The file is composed of a management information block and a data block. The management information block has at least an image management track for storing management information necessary for reproducing image data with respect to each predetermined unit reproducing time, an identifier of the image management track, and a display control track for storing management information of display control data which is composed of a display position of an image which corresponds to the image data. The data block is capable of storing data which is managed by the management information block.

12 Claims, 11 Drawing Sheets

U.S. PATENT DOCUMENTS

| | | | |
|---|---|---|---|
| 2003/0204555 A1* | 10/2003 | Jones et al. | 709/200 |
| 2003/0216889 A1* | 11/2003 | Marko et al. | 702/182 |
| 2004/0117825 A1* | 6/2004 | Watkins | 725/40 |
| 2004/0146285 A1* | 7/2004 | Matsui et al. | 386/98 |
| 2004/0221118 A1* | 11/2004 | Slater et al. | 711/163 |
| 2004/0221311 A1* | 11/2004 | Dow et al. | 725/52 |
| 2004/0267821 A1* | 12/2004 | Kiyama et al. | 707/200 |
| 2005/0030391 A1* | 2/2005 | Ishii | 348/231.99 |
| 2005/0111832 A1* | 5/2005 | Okauchi et al. | 386/95 |
| 2006/0062120 A1* | 3/2006 | Gohda | 369/53.2 |
| 2006/0167936 A1* | 7/2006 | Okauchi et al. | 707/104.1 |
| 2006/0279628 A1* | 12/2006 | Fleming | 348/143 |

FOREIGN PATENT DOCUMENTS

| | | |
|---|---|---|
| JP | 2002-197839 | 7/2002 |
| JP | 2003-050811 | 2/2003 |
| JP | 2003-179859 | 6/2003 |
| WO | WO2004/086395 A1 * | 10/2004 |

OTHER PUBLICATIONS

Rehm, "Representing Internet Streaming Media Metadata using MPEG-7 Multimedia Description Schemes", Nov. 2000, Proceedings of the 2000 ACM Workshops on Multimedia '00, ACM Multimedia Workshop, p. 93-98.*

Koenen et al., MPEG-4 Overview (V. 21—Jeju Version), ISO/IEC JTC1/SC29/WG11 N4668, Mar. 2002, p. 1-75. Retrieved from <http://www.chaiariglione.org/mpeg/standards/mpeg-4/mpeg-4.htm> on Sep. 29, 2007.*

Apple, "QuickTime Toolkit: Advanced Movie Playback and Media Types", Jun. 2004, Morgan-Kauffman, vol. 2, p. cover sheet, copyright p. 5-7, 17.* http://developer.apple.com/documentation/QuickTime/FileFormatSepcification-data.html, "QuickTime File Format", p. 211-p. 212, Mar. 1, 2001, U.S. Apple Computer Inc.

Japanese Office Action mailed Mar. 17, 2008 in counterpart Japanese Application No. 2004-227541.

* cited by examiner

FIG. 4

| ATOM | TYPE NAME |
|---|---|
| Movie Atom { | 'moov' |
|   Movie Header Atom | 'mvhd' |
|   Track atom (video1(Moving Image Management Information)) { | 'trak' |
|     Track Header Atom | 'tkhd' |
|     Edit Atom { | 'edts' |
|       Edit List Atom | 'elst' |
|     } | |
|     Media Atom { | 'mdia' |
|       Media Header Atom | 'mdhd' |
|       Media Handler Reference Atom | 'hdlr' |
|       Media Information Atom { | 'minf' |
|         Video Media Information Header Atom | 'vmhd' |
|         Data Handler Reference Atom | 'hdlr' |
|         Data Information Atom { | 'dinf' |
|           Data Reference Atom | 'dref' |
|         } | |
|         Sample Table Atom { | 'stbl' |
|           Sample Description Atom | 'stsd' |
|           Time-to-Sample Atom | 'stts' |
|           Sample Size Atom | 'stsz' |
|           Sample-to-Chunk Atom | 'stsc' |
|           Chunk Offset Atom | 'stco' |
|         } | |
|       } | |
|     } | |
|   } | |
|   Track Atom (video2(Graphic1 Management Information)) { | 'trak' |
|     Track Header Atom | 'tkhd' |
|     Edit Atom { | 'edts' |
|       Edit List Atom | 'elst' |
|     } | |
|     Media Atom { | 'mdia' |
|       Media Header Atom | 'mdhd' |
|       Media Handler Reference Atom | 'hdlr' |
|       Media Information Atom { | 'minf' |
|         Video Media Information Header Atom | 'vmhd' |
|         Data Handler Reference Atom | 'hdlr' |

FIG. 5

```
            Data Information Atom {                    'dinf'
                Data Reference Atom                    'dref'
            }
            Sample Table Atom {                        'stbl'
                Sample Description Atom                'stsd'
                Time-to-Sample Atom                    'stts'
                Sample Size Atom                       'stsz'
                Sample-to-Chunk Atom                   'stsc'
                Chunk Offset Atom                      'stco'
            }
        }
    }
}
Track Atom (video3(Graphic2 Management Information)) { 'trak'
    Track Header Atom                                  'tkhd'
    Edit Atom {                                        'edts'
      Edit List Atom                                   'elst'
    }
    Media Atom {                                       'mdia'
        Media Header Atom                              'mdhd'
        Media Handler Reference Atom                   'hdlr'
        Media Information Atom {                       'minf'
            Video Media Information Header Atom        'vmhd'
            Data Handler Reference Atom                'hdlr'
            Data Information Atom {                    'dinf'
                Data Reference Atom                    'dref'
            }
            Sample Table Atom {                        'stbl'
                Sample Description Atom                'stsd'
                Time-to-Sample Atom                    'stts'
                Sample Size Atom                       'stsz'
                Sample-to-Chunk Atom                   'stsc'
                Chunk Offset Atom                      'stco'
            }
        }
    }
}
```

FIG. 6

| | |
|---|---|
| Track Atom (GRDC) { | 'trak' |
|   Track Header Atom | 'tkhd' |
|   Edit Atom { | 'edts' |
|     Edit List Atom | 'elst' |
|   } | |
|   Media Atom { | 'mdia' |
|     Media Header Atom | 'mdhd' |
|     Media Handler Reference Atom | 'hdlr' |
|     Media Information Atom { | 'minf' |
|       Video Media Information Header Atom | 'vmhd' |
|       Data Handler Reference Atom | 'hdlr' |
|       Data Information Atom { | 'dinf' |
|         Data Reference Atom | 'dref' |
|       } | |
|       Sample Table Atom { | 'stbl' |
|         Sample Description Atom | 'stsd' |
|         Time-to-Sample Atom | 'stts' |
|         Sample Size Atom | 'stsz' |
|         Sample-to-Chunk Atom | 'stsc' |
|         Chunk Offset Atom | 'stco' |
|       } | |
|     } | |
|   } | |
| } | |
| Movie Data Atom | 'mdat' |

FIG. 8

| Syntax | Bit Number | Mnemonic |
|---|---|---|
| Graphic Parts Control Sample { | | |
| number_of_entries | 16 | uint |
| /* Graphic Parts Control List */ | | |
| for(i=0; i<number_of_entries; i++){ | | |
| track_ID | 32 | uint |
| Display_Position_X | 16 | uint |
| Display_Position_Y | 16 | uint |
| } | | |
| } | | |

RECORDING APPARATUS AND METHOD, REPRODUCING APPARATUS AND METHOD, RECORDING AND REPRODUCING APPARATUS AND METHOD, AND PROGRAM

BACKGROUND OF THE INVENTION

1. Field of the Invention

This invention relates to recording apparatus and method, reproducing apparatus and method, recording and reproducing apparatus and method, and a program, and in particular, relates to recording apparatus and method, reproducing apparatus and method, recording and reproducing apparatus and method, and a program which are configured in such a manner that it is possible to easily edit and reproduce a display position of image data.

2. Description of Related Art

Conventionally, as a multimedia-compatible file format, QuickTime (trademark) file format (hereinafter, referred to as QT format) has been widely known.

In this QT format, actual data due to images (moving images and still images) or sounds is collected up and blocked, and in addition, separately from these actual data blocks, management information for managing actual data is collected up and blocked. Hereinafter, the suchlike block is referred to as Atom, and Atom, in which actual data is collected up, is referred to as Movie Data Atom, and Atom, in which management information is collected up, is referred to as Movie Atom.

In Movie Atom, a track (Atom), which is composed of a hierarchical structure for collecting up and managing management information with respect to each attribute, is formed. Concretely speaking, in case that media data is configured by image data and sound data, in Movie Atom, a video track and an audio track are formed, respectively, and corresponding actual data of Movie Data Atom is managed by each track, respectively.

In QT format in which information of actual data is managed in this manner, on the occasion of displaying image data (Graphic data) such as JPEG (Joint Photographic Expert Group) and PNG (Portable Network Graphics), in order to specify its display position, as shown in Non-Patent Document 1, matrix information in tkhd (Track Header) Atom of a video track for managing image data has to be set up to a predetermined value.

Non-Patent Document 1: "QuickTime File Format", P211, P212, [online] Mar. 1, 2001, U.S. Apple Computer Inc., [searched on Jul. 21, 2004], Internet <http://developer.apple.com/documentation/QuickTime/FileFor matSpecification-data.html>

However, since this tkhd ATM can simply specify one way for all reproducing time of a video track, for example, in case of desiring to change a display position of image data by time, or, in case of desiring to display the same image data at different display positions simultaneously, etc., it becomes necessary to prepare video track files to the number of display positions. On this account, there was such a problem that entire Movie Atom, in which management information is collected up, is enlarged, and recording and reproducing processing of a file becomes complex.

The invention is made in view of the suchlike circumstances, and enables to easily edit and reproduce a display position of image data.

SUMMARY OF THE INVENTION

A recording apparatus of the invention is characterized by having a file generating section for generating a file which is composed of, a management information block having at least an image management track for storing management information necessary for reproducing image data with respect to each predetermined unit reproducing time, an identifier of the image management track, and a display control track for storing management information of display control data which is composed of a display position of an image which corresponds to the image data, and a data block which is capable of storing data which is managed by the management information block, and a recording section for recording the file which is generated by the file generating section, in a recording medium.

It is possible to configure in such a manner that the display control data is stored in the data block.

A recording method of the invention is characterized by including a file generating step for generating a file which is composed of a management information block having at least an image management track for storing management information necessary for reproducing image data with respect to each predetermined unit reproducing time, an identifier of the image management track, and a display control track for storing management information of display control data which is composed of a display position of an image which corresponds to the image data, and a data block which is capable of storing data which is managed by the management information block, and a recording step for recording the file which is generated by the file generating step, in a recording medium.

A first program of the invention is characterized by including a file generating step for generating a file which is composed of a management information block having at least an image management track for storing management information necessary for reproducing image data with respect to each predetermined unit reproducing time, an identifier of the image management track, and a display control track for storing management information of display control data which is composed of a display position of an image which corresponds to the image data, and a data block which is capable of storing data which is managed by the management information block, and a recording step for recording the file which is generated by the file generating step, in a recording medium.

A reproducing apparatus of the invention is characterized by having a reading section for reading out a management information block from a recording medium on which recorded is a file which is composed of a management information block having at least an image management track for storing management information necessary for reproducing image data with respect to each predetermined unit reproducing time, an identifier of the image management track, and a display control track for storing management information of display control data which is composed of a display position of an image which corresponds to the image data, and a data block which is capable of storing data which is managed by the management information block, and a display control section for controlling display of an image which corresponds to image data reproduced with reference to the image management track of the management information block which was read out by the reading section, on the basis of display control data which is reproduced with reference to the display control track of the management information block read out by the reading section.

It is possible to configure in such a manner that the display control data is stored in the data block.

A reproducing method of the invention is characterized by including a reading step for reading out a management information block from a recording medium on which recorded is a file which is composed of a management information block having at least an image management track for storing management information necessary for reproducing image data with respect to each predetermined unit reproducing time, an identifier of the image management track, and a display control track for storing management information of display control data which is composed of a display position of an image which corresponds to the image data, and a data block which is capable of storing data which is managed by the management information block, and a display control step for controlling display of an image which corresponds to image data reproduced with reference to the image management track of the management information block which was read out by the reading step, on the basis of display control data which is reproduced with reference to the display control track of the management information block read out by the reading step.

A second program of the invention is characterized by including a reading step for reading out a management information block from a recording medium on which recorded is a file which is composed of a management information block having at least an image management track for storing management information necessary for reproducing image data with respect to each predetermined unit reproducing time, an identifier of the image management track, and a display control track for storing management information of display control data which is composed of a display position of an image which corresponds to the image data, and a data block which is capable of storing data which is managed by the management information block, and a display control step for controlling display of an image which corresponds to image data reproduced with reference to the image management track of the management information block which was read out by the reading step, on the basis of display control data which is reproduced with reference to the display control track of the management information block read out by the reading step.

A recording and reproducing apparatus of the invention is characterized by having a file generating section for generating a file which is composed of a management information block having at least an image management track for storing management information necessary for reproducing image data with respect to each predetermined unit reproducing time, an identifier of the image management track, and a display control track for storing management information of display control data which is composed of a display position of an image which corresponds to the image data, and a data block which is capable of storing data which is managed by the management information block, a recording section for recording the file which is generated by the file generating section, in a recording medium, a reading section for reading out the management information block from the recording medium, and a display control section for controlling display of an image which corresponds to image data reproduced with reference to the image management track of the management information block which was read out by the reading section, on the basis of display control data which is reproduced with reference to the display control track of the management information block read out by the reading section.

It is possible to configure in such a manner that the display control data is stored in the data block.

A recording and reproducing method of the invention is characterized by including a file generating step for generating a file which is composed of a management information block having at least an image management track for storing management information necessary for reproducing image data with respect to each predetermined unit reproducing time, an identifier of the image management track, and a display control track for storing management information of display control data which is composed of a display position of an image which corresponds to the image data, and a data block which is capable of storing data which is managed by the management information block, a recording step for recording the file which is generated by the file generating step, in a recording medium, a reading step for reading out the management information block from the recording medium, and a display control step for controlling display of an image which corresponds to image data reproduced with reference to the image management track of the management information block which was read out by the reading step, on the basis of display control data which is reproduced with reference to the display control track of the management information block read out by the reading step.

A third program of the invention is characterized by including a file generating step for generating a file which is composed of a management information block having at least an image management track for storing management information necessary for reproducing image data with respect to each predetermined unit reproducing time, an identifier of the image management track, and a display control track for storing management information of display control data which is composed of a display position of an image which corresponds to the image data, and a data block which is capable of storing data which is managed by the management information block, a recording step for recording the file which is generated by the file generating step, in a recording medium, a reading step for reading out the management information block from the recording medium, and a display control step for controlling display of an image which corresponds to image data reproduced with reference to the image management track of the management information block which was read out by the reading step, on the basis of display control data which is reproduced with reference to the display control track of the management information block read out by the reading step.

In the first invention, a file, which is composed of a management information block having at least an image management track for storing management information necessary for reproducing image data with respect to each predetermined unit reproducing time, an identifier of the image management track, and a display control track for storing management information of display control data which is composed of a display position of an image which corresponds to the image data, and a data block which is capable of storing data which is managed by the management information block, is generated, and the generated file is recorded on a recording medium.

The recording apparatus may be an independent apparatus, or a block which carries out recording processing of a recording and reproducing apparatus.

In the second invention, from a recording medium on which recorded is a file which is composed of, a management information block having at least an image management track for storing management information necessary for reproducing image data with respect to each predetermined unit reproducing time, an identifier of the image management track, and a display control track for storing management information of display control data which is composed of a display position of an image which corresponds to the image data, and a data block which is capable of storing data which is managed by the management information block, management information block is read out, and on the basis of display control data which is reproduced with reference to a display control track of the read management information block, controlled is display of an image which corresponds to image data reproduced with reference to an image management track of the read management information block.

The reproducing apparatus may be an independent apparatus, or a block which carries out reproducing processing of a recording and reproducing apparatus.

In the third invention, a file, which is composed of a management information block having at least an image management track for storing management information necessary for reproducing image data with respect to each predetermined unit reproducing time, an identifier of the image management track, and a display control track for storing management information of display control data which is composed of a display position of an image which corresponds to the image data, and a data block which is capable of storing data which is managed by the management information block, is generated, and the generated file is recorded on a recording medium. Then, a management information block is read out from the recording medium, and on the basis of display control data which is reproduced with reference to a display control track of the read management information block, controlled is display of an image which corresponds to image data reproduced with reference to an image management track of the read management information block.

According to the invention, it is possible to easily edit and reproduce a display position of image data. In addition, according to the invention, it is possible to reduce a load of a system, and to suppress a bug etc. which relate to display control.

BRIEF DESCRIPTION OF THE DRAWINGS

The invention, together with further advantages thereof, may best be understood by reference to the following description taken in conjunction with the accompanying drawings in which:

FIG. 4 is a view which shows a configuration example of a QT file to which the invention was applied;

FIG. 5 is a view which shows a configuration example of a QT file to which the invention was applied;

FIG. 6 is a view which shows a configuration example of a QT file to which the invention was applied;

FIG. 8 is a view which shows a format example of a GRDC sample;

DETAILED DESCRIPTION OF THE PREFERRED EMBODIMENTS

Hereinafter, embodiments of the invention will be described, and exemplification of a corresponding relation of constituent elements described in claims and concrete examples in embodiments is as follows. This description is used for checking that a concrete example for supporting the invention described in claim is described in the embodiments. Therefore, even if there is a concrete example which is described in the embodiment but is not described here as one which corresponds to a constituent element, it does not mean that the concrete example is not one which corresponds to that constituent element. Inversely, even if a concrete example is described here as one which corresponds to a constituent element, it does not mean that the concrete example is one which does not correspond to another constituent element besides the constituent element.

Further, this description does not mean that inventions, which correspond to concrete examples described in the embodiments, are all described in claims. In other words, this description is an invention which corresponds to a concrete example described in the embodiments, and does not deny existence of an invention which is not described in claims of this application, i.e., existence of an invention which will be filed as a divisional application and added by amendment in the future.

Figure 1:
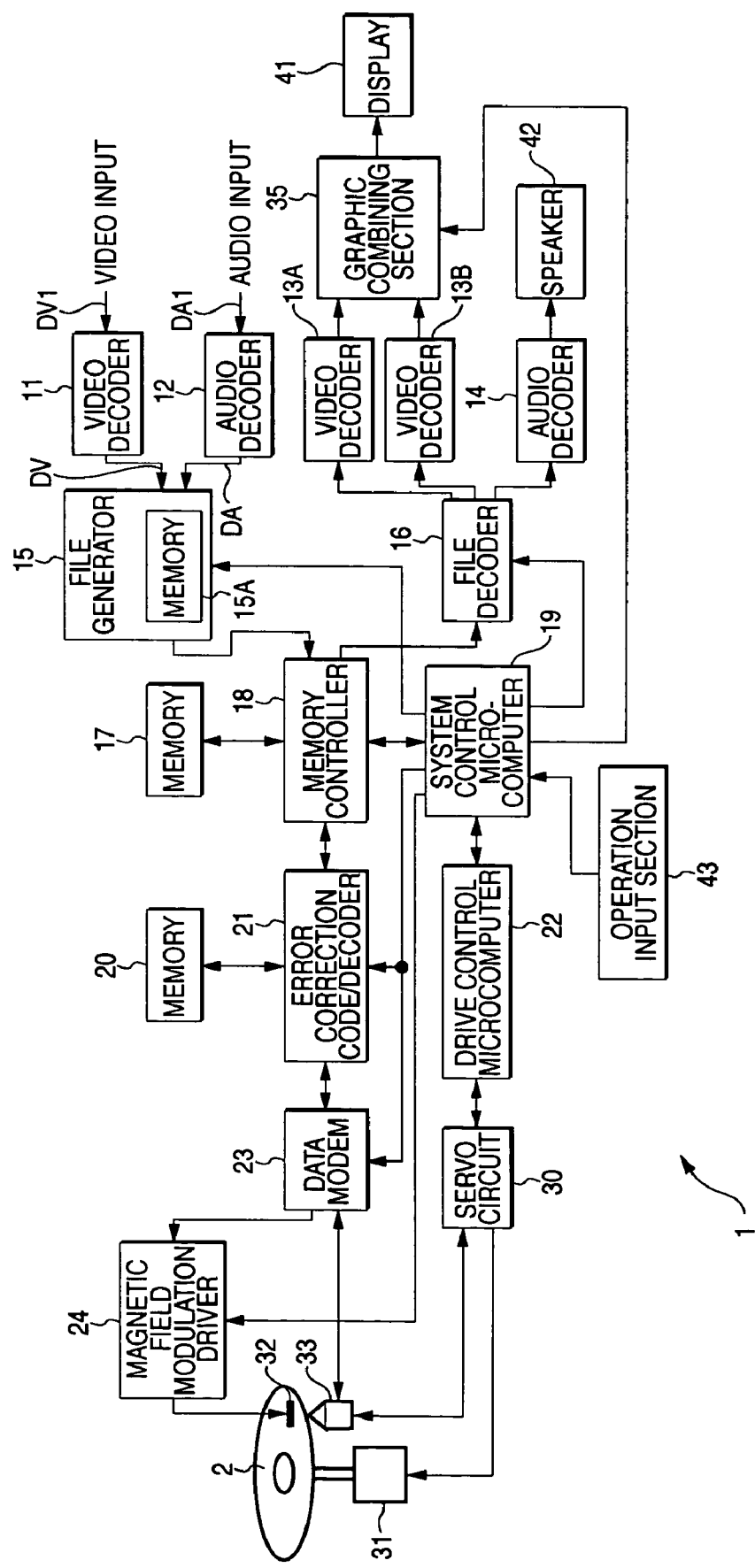
FIG. 1 is a block diagram which shows a configuration example of a recording and reproducing apparatus of the invention.
Figure 7:
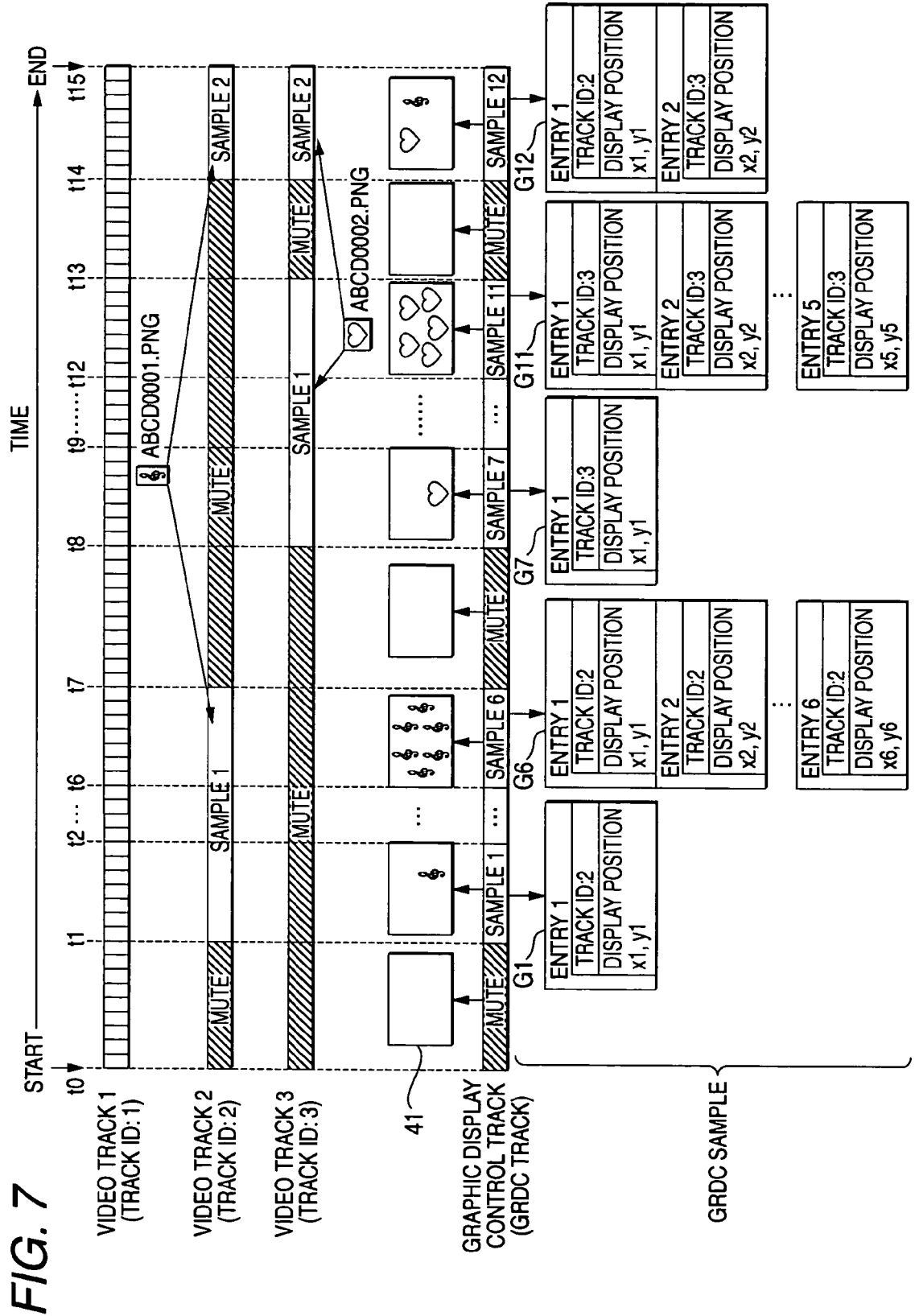
FIG. 7 is a view which explains the QT files of FIGS. 4 through 7 in detail.

A recording apparatus, which is described in claim 1, is characterized by having a file generating section (e.g., file generator 15 of FIG. 1) for generating a file (e.g., QT file of FIGS. 4 through 6) which is composed of a management information block (e.g., Movie Atom of FIGS. 4 through 6) having at least an image management track (e.g., video track 2 of FIG. 7) for storing management information necessary for reproducing image data (e.g., graphic data 1 (ABCD0001.PNG) of FIG. 7) with respect to each predetermined unit reproducing time, an identifier (e.g., track ID:2 of FIG. 7) of the image management track, and a display control track (e.g., graphic display control (GRDC) track of FIG. 7) for storing management information of display control data (e.g., GRDC sample G1 of FIG. 7) which is composed of a display position (e.g., display positions x1, y1 of FIG. 7) of an image which corresponds to the image data, and a data block (e.g., Movie Data Atom of FIG. 6) which is capable of storing data which is managed by the management information block, and a recording section (e.g., system control microcomputer 19 of FIG. 1) for recording the file which is generated by the file generating section, in a recording medium (e.g., optical disk 2 of FIG. 1).

A recording method, which is described in claim 3, is characterized by including a file generating step (e.g., step S13, S14, S16, or S17 of FIG. 9) for generating a file which is composed of a management information block having at least an image management track for storing management information necessary for reproducing image data with respect to each predetermined unit reproducing time, an identifier of the image management track, and a display control track for storing management information of display control data which is composed of a display position of an image which corresponds to the image data, and a data block which is capable of storing data which is managed by the management information block, and a recording step (e.g., step S15 or S18 of FIG. 9) for recording the file which is generated by the file generating step, in a recording medium.

Meanwhile, a program, which is described in claim 4, is of basically the same configuration as that of the above-described recording method described in claim 3, and therefore, an explanation will be omitted so as to avoid a repetitive explanation.

A reproducing apparatus, which is described in claim 5, is characterized by having a reading section (e.g., memory controller 18 of FIG. 1) for reading out a management information block from a recording medium (e.g., optical disk 2 of FIG. 1) on which recorded is a file (e.g., QT file of FIGS. 4 through 6) which is composed of a management information block (e.g., Movie Atom of FIGS. 4 through 6) having at least an image management track (e.g., video track 2 of FIG. 7) for storing management information necessary for reproducing image data (e.g., graphic data 1 (ABCD0001.PNG) of FIG. 7) with respect to each predetermined unit reproducing time, an identifier (e.g., track ID:2 of FIG. 7) of the image management track, and a display control track (e.g., graphic display control (GRDC) track of FIG. 7) for storing management information of display control data (e.g., GRDC sample G1 of FIG. 7) which is composed of a display position (e.g., display positions x1, y1 of FIG. 7) of an image which corresponds to the image data, and a data block (e.g., Movie Data Atom of FIG. 6) which is capable of storing data which is managed by the management information block, and a display control section (e.g., graphic combining section 35 of FIG. 1) for controlling display of an image which corresponds to image data reproduced with reference to the image management track of the management information block which was read out by the reading section, on the basis of display control data which is reproduced with reference to the display control track of the management information block read out by the reading section.

A reproducing method, which is described in claim 7, is characterized by including a reading step (e.g., step S31 of FIG. 10) for reading out a management information block from a recording medium on which recorded is a file which is composed of a management information block having at least an image management track for storing management information necessary for reproducing image data with respect to each predetermined unit reproducing time, an identifier of the image management track, and a display control track for storing management information of display control data which is composed of a display position of an image which corresponds to the image data, and a data block which is capable of storing data which is managed by the management information block, and a display control step (e.g., step S34 of FIG. 10) for controlling display of an image which corresponds to image data reproduced with reference to the image management track of the management information block which was read out by the reading step, on the basis of display control data which is reproduced with reference to the display control track of the management information block read out by the reading step.

Meanwhile, a program, which is described in claim 8, is of basically the same configuration as that of the above-described reproducing method described in claim 7, and therefore, an explanation will be omitted so as to avoid a repetitive explanation.

A recording and reproducing apparatus, which is described in claim 9, is characterized by having a file generating section (e.g., file generator 15 of FIG. 1) for generating a file (e.g., QT file of FIGS. 4 through 6) which is composed of a management information block (e.g., Movie Atom of FIGS. 4 through 6) having at least an image management track (e.g., video track 2 of FIG. 7) for storing management information necessary for reproducing image data (e.g., graphic data 1 (ABCD0001.PNG) of FIG. 7) with respect to each predetermined unit reproducing time, an identifier (e.g., track ID:2 of FIG. 7) of the image management track, and a display control track (e.g., graphic display control (GRDC) track of FIG. 7) for storing management information of display control data (e.g., GRDC sample G1 of FIG. 7) which is composed of a display position (e.g., display positions x1, y1 of FIG. 7) of an image which corresponds to the image data, and a data block (e.g., Movie Data Atom of FIG. 6) which is capable of storing data which is managed by the management information block, a recording section (e.g., system control microcomputer 19 of FIG. 1) for recording the file which is generated by the file generating section, in a recording medium (e.g., optical disk 2 of FIG. 1), a reading section (e.g., memory controller 18 of FIG. 1) for reading out a management information block from the recording medium, and a display control section (e.g., graphic combining section 35 of FIG. 1) for controlling display of an image which corresponds to image data reproduced with reference to the image management track of the management information block which was read out by the reading section, on the basis of display control data which is reproduced with reference to the display control track of the management information block read out by the reading section.

A recording and reproducing method, which is described in claim 11, is characterized by including a file generating step (e.g., step S13, S14, S16, or S17 of FIG. 9) for generating a file which is composed of a management information block having at least an image management track for storing management information necessary for reproducing image data with respect to each predetermined unit reproducing time, an identifier of the image management track, and a display control track for storing management information of display control data which is composed of a display position of an image which corresponds to the image data, and a data block which is capable of storing data which is managed by the management information block, a recording step (e.g., step S15 or S18 of FIG. 9) for recording the file which is generated by the file generating step, in a recording medium, a reading step (e.g., step S31 of FIG. 10) for reading out the management information block from the recording medium, and a display control step (e.g., step S34 of FIG. 10) for controlling display of an image which corresponds to image data reproduced with reference to the image management track of the management information block which was read out by the reading step, on the basis of display control data which is reproduced with reference to the display control track of the management information block read out by the reading step.

Meanwhile, a program, which is described in claim 12, is of basically the same configuration as that of the above-described recording and reproducing method described in claim 11, and therefore, an explanation will be omitted so as to avoid a repetitive explanation.

Hereinafter, embodiments of the invention will be described with reference to the drawings.

FIG. 1 represents a configuration example of a recording and reproducing apparatus 1 to which the invention is applied. An optical disk 2 can be attached to and detached from the recording and reproducing apparatus 1 of FIG. 1. In this recording and reproducing apparatus 1, by an imaging section and a microphone which are not shown in the figure, video signals and audio signals of an object of shooting are inputted, and an imaging result, which is composed of the video signals and audio signals, is converted into video data and audio data, and then, recorded on an optical disk 2, and in addition, the video data and audio data, which are an imaging result recorded on the optical disk 2, are reproduced, and video images and sounds, which correspond to the reproduced video data and audio data, are outputted from a display 41 and a speaker 42, respectively.

On the optical disk 2, an imaging result, which is composed of video signals and audio signals inputted to the recording and reproducing apparatus 1, is recorded as a file with a predetermined format, and in addition, through a communication section which is not shown in the figure, from another information processing apparatus which is connected to LAN (Local Area Network) or a server which is connected to Internet, various data, which was changed to a file with the same format as that of the video signals and audio signals, is obtained and recorded. Meanwhile, various data is configured by data such as video data, audio data or JPEG (Joint Photographic Experts Group) and PNG (Portable Network Graphics) (hereinafter, referred to as graphic data in order to distinguish it from video data).

A user takes a look at a video image which is outputted from the display 41 and operates an operation input section 43, and thereby, an editing instruction of video data, audio data or graphic data is inputted to the recording and reproducing apparatus 1. The recording and reproducing apparatus 1 accepts the editing instruction through the operation input section 43, and carries out editing processing such as combining graphic data which was obtained in advance, with video data as an imaging result.

In the recording and reproducing apparatus 1, video signals and audio signals as an inputted imaging result are compressed in a MPEG (Moving Picture Experts Group) format, and thereafter, recorded on the optical disk 2 in the Quick-Time (trademark) file format (hereinafter, referred to as QT format). Meanwhile, hereinafter, a file by use of the QT format is also arbitrarily referred to as a QT file.

In the QT format, actual data, which is composed of video data and audio data, is collected up and blocked, and in addition, separately from these actual data blocks, management information for managing actual data is collected up and blocked. Hereinafter, the suchlike block is referred to as Atom, and Atom, in which actual data is collected up, is referred to as Movie Data Atom, and Atom, in which management information is collected up, is referred to as Movie Atom.

A video encoder 11 of the recording and reproducing apparatus 1 applies analog-to-digital conversion processing to video signals DV1 inputted from an imaging section which is not shown in the figure, to generate video data, and applies encoding processing to the generated video data in accordance with a MPEG format, and outputs the encoded video data to a file generator 15 as an elementary stream DV.

An audio encoder 12 applies analog-to-digital conversion processing to audio signals DA1 inputted from a microphone which is not shown in the figure, to generate audio data, and applies encoding processing to the generated audio data in accordance with the MPEG format, and outputs the encoded audio data to the file generator 15 as an elementary stream DA.

The file generator 15 multiplexes the elementary streams DV and DA from the video encoder 11 and the audio encoder 12 in a synchronized manner, and generates a QT file under the control of a system control microcomputer 19. That is, the file generator 15 multiplexes the elementary streams DV and DA which are inputted sequentially, and outputs data of Movie Data Atom sequentially to a memory controller 18, and over doing so, adds data necessary for generation of Movie Atom which corresponds to data of Movie Data Atom, in an incorporated memory 15A to hold it therein. When recording of Movie Data Atom is completed, the file generator 15 generates a data string of Movie Atom from data held in the memory 15A, and outputs it to the memory controller 18.

The memory controller 18 changes over a recording or reproducing operation, under the control of the system control microcomputer 19, and in case of the recording operation, records sequentially a data string of a QT file which is inputted from the file generator 15 to a memory 17, and holds it temporarily, and outputs data, which was held depending on processing of an error correction code/decoder 21, to the error correction code/decoder 21. In addition, the memory controller 18, in case of the reproducing operation, holds data from the error correction code/decoder 21 temporarily in a memory 17, and outputs it to a file decoder 16 and a system control microcomputer 19.

The error correction code/decoder 21 changes over a recording or reproducing operation, under the control of the system control microcomputer 19, and in case of the recording operation, records data from the memory controller 18 temporarily in a memory 20 and adds an error correction code thereto, and reads out and outputs data which was held in the memory 20, in predetermined order. That is, the error correction code/decoder 21 applies interleave processing to data from the memory controller 18 and outputs it to a data modem 23.

In addition, the error correction code/decoder 21, in case of the reproducing operation, records temporarily data from the data modem 23 in the memory 20 in predetermined order, and thereafter, outputs it to the memory controller 18. That is, the error correction code/decoder 21 applies de-interleave processing to the data from the data modem 23 and outputs it to the memory controller 18. Further, at this time, the error correction code/decoder 21 carries out error correction processing by use of the error correction code which was added at the time of the recording operation.

The data modem 23 changes over a recording or reproducing operation under the control of the system control microcomputer 19, and in case of the recording operation, converts data from the error correction code/decoder 21 into a serial data string, and thereafter, applies modulation processing thereto, and outputs it to a magnetic field modulation driver 24 or an optical pickup 33. In addition, the data modem 23, in case of the reproducing operation, reproduces clocks from reproduced signals which are inputted from the optical pickup 33, and on the basis of this clock, applies binary identification, demodulation processing to the reproduced signals, and thereby, obtains reproduction data which corresponds to the serial data string generated at the time of the recording operation, and outputs the obtained reproduction data to the error correction code/decoder 21.

The magnetic field modulation driver 24 drives a magnetic field head 32 by an output signal of the data modem 23, under the control of the system control microcomputer 19, in case that the optical disk 2 is a magneto-optical disk, at the time of the recording operation. The magnetic field head 32 is held in such a manner that it is opposite to the optical pickup 33 through the optical disk 2, and applies a modulation magnetic field which depends on output data of the data modem 23, to a laser beam irradiation position by the optical pickup 33. By this means, in the recording and reproducing apparatus 1, in case that the optical disk 2 is a magneto-optical disk, by use of a method of thermo-magnetic recording, an imaging result is recorded on the optical disk 2 as a QT format file.

The optical disk 2 is a disk-shaped recording medium, and is configured by a rewritable optical disk such as a magneto-optical disk (including MO(trademark): Magneto-Optical Disk) and a phase-change type disk.

A spindle motor 31 drives this optical disk 2 rotationally by control of a servo circuit 30, with a condition of CLV (Constant Linear Velocity), CAV (Constant Angular Velocity) or ZCLV (Zone Constant Linear Velocity) etc., depending on the optical disk 2.

The servo circuit 30 controls an operation of the spindle motor 31 on the basis of various signals from the optical pickup 33, and carries out processing of spindle control. In addition, the servo circuit 30 applies tracking control and focus control to the optical pickup 33, in the same manner, and in addition, has the optical pickup 33 and the magnetic field head 32 executed seek operations, and further, has them also executed processing such as focus search.

A drive control microcomputer 22 controls an operation such as seek in the servo circuit 30, under the control of the system control microcomputer 19.

The optical pickup 33 irradiates the optical disk 2 with laser beam, and receives its return light by a predetermined light receiving device, and processes to calculate a light reception result, and thereby, generates various control signals, and outputs them to the servo circuit 30, and in addition, outputs a reproduction signal, a signal level of which changes depending on a bit string, a mark string formed on the optical disk 2, to the data modem 23.

The optical pickup 33 changes over a recording or reproducing operation under the control of the system control microcomputer 19, and in case that it is the recording operation and the optical disk 2 is a magneto-optical disk, increases light quantity of a laser beam which is irradiated to the optical disk 2, intermittently. By this means, in the recording and reproducing apparatus 1, an imaging result is recorded on the optical disk 2 as a QT format file, by a pulse train method. In addition, in case that the optical disk 2 is a phase-change type disk etc., depending on data from the data modem 23, light quantity of a laser beam which is irradiated to the optical disk 2 is increased from light quantity in case of the reproducing operation to light quantity in case of the recording operation, and by this means, by use of a method of thermal recording, an imaging result is recorded on the optical disk 2 as a QT format file.

As above, in the recording and reproducing apparatus 1, inputted video signals and audio signals are data-compressed by the video encoder 11 and the audio encoder 12, and converted into elementary streams, and thereafter, converted into a QT format file by the file generator 15. Then, the converted QT format file is recorded on the optical disk 2 by the optical pickup 33, or by the optical pickup 33 and the magnetic field head 32, passing through the memory controller 18, the error correction code/decoder 21, and the data modem 32 sequentially.

Meanwhile, as described above, on the optical disk 2, video signals and audio signals as an imaging result inputted to the recording and reproducing apparatus 1 are recorded as a QT format file, and in addition, through a communication section which is not shown in the figure, from another information processing apparatus which is connected to LAN etc. or a server which is connected to Internet, various data such as video data, audio data, or graphic data, which was changed to the QT format file, is obtained and recorded on the optical disk 2.

On one hand, in the recording and reproducing apparatus 1, reproduction signals, which are obtained from the optical pickup 33, are processed by the data modem 23, and thereby, reproduction data is obtained, and processed by the error correction code/decoder 21, and the QT format file, which was recorded on the optical disk 2, is reproduced. Then, data of the reproduced QT file is outputted to the file decoder 16 and the system control microcomputer 19, through the memory controller 18.

The file decoder 16 accepts, at its input, data of the QT file from the memory controller 18, and breaks down the inputted QT file data into elementary streams of video data and audio data, and graphic data, and then, outputs them.

At this time, the file decoder 16 obtains and holds data of Movie Atom in advance, by control such as seek by the system control microcomputer 19, and on the basis of management information set up in Movie Atom, outputs an elementary stream of video data to a video decoder 13A, and an elementary stream of audio data to an audio decoder 14. In addition, the file decoder 16 outputs other video data etc. (e.g., graphic data) than the elementary stream of video data, to a video decoder 13B.

The video decoder 13A data-decompresses the elementary stream of video data from the file decoder 16, and outputs it to the graphic combing section 35. The video decoder 13B decompresses graphic data etc. from the file decoder 16, and outputs it to the graphic combining section 35. That is, in the recording and reproducing apparatus 1, data, which was decompressed by the video decoder 13A and the video decoder 13B respectively, is outputted to the graphic combining section 35 in a simultaneous parallel manner.

The graphic combining section 35 outputs the video data outputted from the video decoder 13A, on the display 41, in normal reproducing processing, under the control of the system control microcomputer 19. In addition, the graphic combining section 35 sets up a display position and display number of graphic data which is outputted from the video decoder 13B, in case of reproducing processing of data for which editing processing was executed, and overlaps graphic data of the set display position and display number, with video data which is outputted from the video decoder 13A, and outputs it to the display 41.

The display 41 is configured by LCD (Liquid Crystal Display) etc., and outputs video images which correspond to video data from the graphic combining section 35.

The audio decoder 14 decompresses the elementary stream of audio data from the file decoder 16, and outputs it to the speaker 42. The speaker 42 outputs sounds which correspond to audio data from the audio decoder 14.

Meanwhile, in the recording and reproducing apparatus 1, it was configured in such a manner that video images and sounds, which correspond to the reproduced video data and audio data, are outputted to the display 41 and the speaker 42, but it is all right even if it is configured in such a manner that an external device, which is not shown in the figure, is connected thereto and they are outputted to the external device.

The system control microcomputer 19 is a microcomputer which controls an operation of the entire recording and reproducing apparatus 1, and on the basis of execution of a predetermined processing program recorded in a memory which is not shown in the figure, or an instruction signal which is inputted through the operation input section 43 and corresponds to an operation of a user, controls an operation of each section of the recording and reproducing apparatus 1. Concretely speaking, the system control microcomputer 19 controls an operation of each section of the recording and reproducing apparatus 1, and records an imaging result on the optical disk 2, and reproduces the imaging result recorded on the optical disk 2, and further, executes editing processing.

The operation input section 43 is configured by, for example, buttons and keys which are placed on a surface of the recording and reproducing apparatus 1, and supplies an instruction signal which corresponds to an operation of a user, to the system control microcomputer 19. Meanwhile, it is all right even if the operation input section 43 is configured by a touch panel etc. which is laminated on the display 41 configured by LCD etc.

Figure 2:
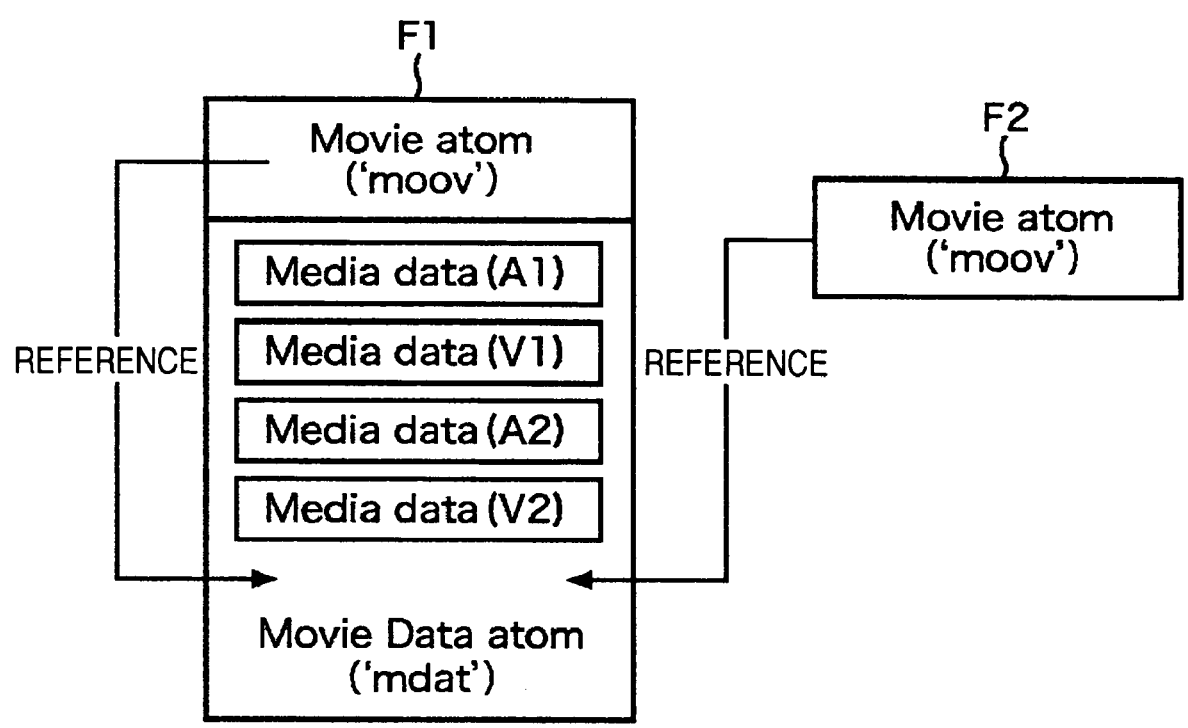
FIG. 2 is a view which schematically explains a QT file.

Next, with reference to FIG. 2, the QT file will be schematically described.

The QT format is a file format which was prepared as an extended function of OS (Operating System) for the purpose of reproducing moving images etc. without using a particular kind of hardware. The QT format is a time-base multimedia file format which is capable of reproducing actual data of various forms such as moving images, sounds, still images, characters, or MIDI (Musical Instruments Digital Interface), by synchronizing them on one time-base, and also corresponding to streaming reproduction through a network which is not shown in the figure.

In the QT file, actual data of these various forms is used as media data, and in addition, stored in an individual track, respectively. For example, tracks of actual data due to, for example, moving images (still images), sounds, and characters, are called as a video track, an audio track, and a text track, respectively, and they are strictly managed on time-base. Meanwhile, in the QT file, among others, a track which manages data in which video data and audio data are multiplexed, for example, a MPEG2-PS track which manages MPEG2-PS (Program Stream) data, etc. are also included.

As shown in a QT file F1 of FIG. 2, the QT file is roughly configured by Movie Atom, and Movie Data Atom. As to Movie Data Atom, a type of Atom is set to "mdat", and it is also referred to as Media Data. In contrast to this, as to Movie Atom, a type of Atom is set up to "moov", and it is also referred to as Movie Resource. Meanwhile, there is also such a case that Atom is expressed as Box.

Movie Atom stores time information which is necessary for reproducing a QT file, place information which is necessary for referring an actual data portion (Movie Data Atom), etc., and Movie Data Atom stores video and audio actual data, in respective kinds of tracks. That is, Movie Data Atom of the QT file F1 stores tracks of Media data (A1) which is composed of audio data A1, Media data (V1) which is composed of video data V1, Media data (A2) which is composed of audio data A2, and Media data (V2) which is composed of video data V2.

Meanwhile, in the QT format, as shown in the QT file F1, it is possible to close and store Movie Atom and Movie Data Atom in one file, but there is not necessarily need to configure in that manner, and for example, as shown in a QT file F2, it is also possible to store management information which is specified by use of an external file name (e.g., a relative path and an absolute path on a recording medium) which includes media data to be referred externally, in Movie Atom of the QT file F2, in order to be able to refer Movie Data Atom which exists in another file (e.g., QT file F1).

That is, the QT file F1 is a self-internal capsule type file of such a form that Movie Data Atom and Movie Atom were integrated, and the QT file F2 is an external reference type file of such a form that it is composed of only Movie Atom, and in the QT file F2, it is configured so as to use Movie Data Atom which exists in another QT file F1, as a management object.

As above, in the example of FIG. 2, Movie Data Atom of the self-internal capsule type QT file F1 stores media data which is composed of audio data A1 and A2, and media data which is composed of video data V1 and V2, and media data of Movie Data Atom of the QT file F1 is reproduced by Movie Atom of the Qt file F1, or Movie Atom of the external reference type QT file F2.

Figure 3:
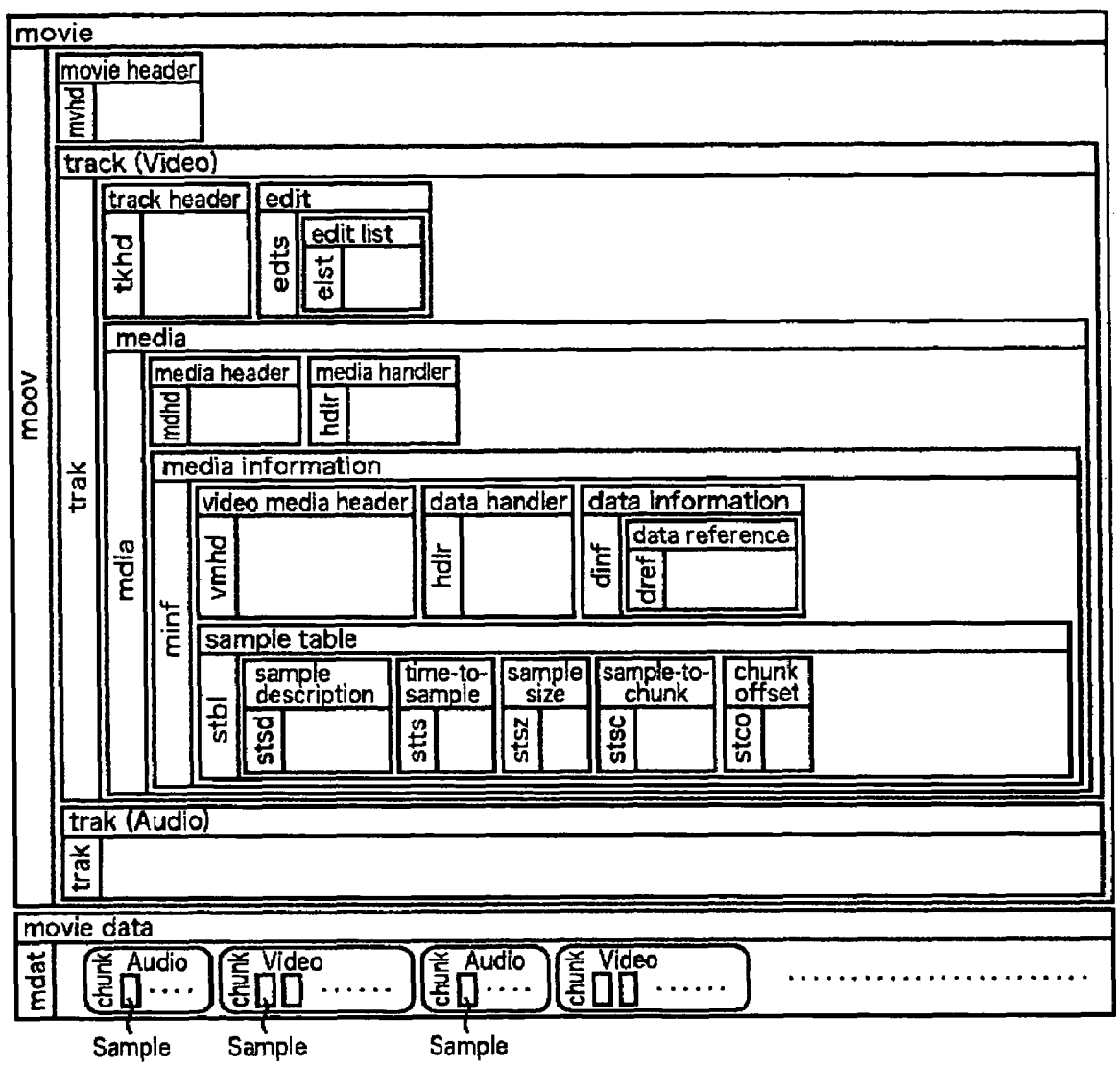
FIG. 3 is a view which explains the QT file in detail.

Next, with reference to FIG. 3, the QT file will be described in detail. FIG. 3 is a view which shows a configuration example of the self-internal capsule type QT file which handles general audio data and video data. Meanwhile, in an example of FIG. 3, an Atom name is shown on an upper portion of each Atom, and a type name, which is set to each Atom, is shown on a left side of each Atom, and in respective Atom names, atom is omitted.

In Movie Atom, according to need, there exist a plurality of layers called as a track for storing management information of media data such as video data and audio data which are stored in Movie Data Atom, with respect to each type of media. Each track layer has a media layer for managing information such as a compression method, a storage place, or display time of each actual data, and the media layer is storing information such as a size of a management minimum unit sample which shows by what unit data is stored in Movie Data Atom, a chunk in which some samples are collected up and blocked, a storage place of the chunk, and display time of each sample.

Concretely describing, Movie Atom is configured by a movie header atom and a track atom. In the movie header atom, header information, which relates to an entire QT file, is described, and a type name is set up to "mvhd". In the track atom, information, which relates to data stored in Movie Data Atom with respect to each track, is described, and a type name is set up to "trak". In case of the example of FIG. 3, a video track and an audio track are disposed. Meanwhile, in Movie Atom, as to the track atom, an atom structure of a lower layer is of the same configuration in the video track and the audio track, and therefore, in the example of FIG. 3, graphic representation of the lower layer of the track atom of the audio track is omitted.

The track atom is configured by a track header atom (type name "tkhd") in which header information relating to an entire tarck is described, an edit atom (type name "edts") in which information relating to a time relation with media which configures a track is described, and a media atom (type name "mdia") in which information relating to actual data which is actually used in a track (information for managing compression method, storage place, and display time etc.) is described.

The edit atom includes an edit list atom (type name "elst") in which a relation of time-base of a track and time-base of media is described according to need of non-linear editing etc.

The media atom is configured by a media header atom (type name "mdhd") in which header information relating to entire media is described, a media handler atom (type name "hdlr") in which information relating to a type and handling with respect to each media is described, and a media information atom (type name "minf") in which various information relating to a sample as a minimum management unit is described.

The media information atom is configured by, in case of a video track, a video media information atom (type name "vmhd") in which header information relating to video media is described, a data handler reference atom (type name "hdlr") in which information relating to handling of corresponding actual data is described, a data information atom (type name "dinf") in which information relating to a storage destination of data to be referred is described, and a sample table atom (type name "stbl") in which information relating to each sample is described.

Meanwhile, in case of an audio track, the media information atom includes a sound media information header atom (type name "smhd") in which header information relating to sound media is described, in lieu of vmhd. Further, in case that video data and audio data are multiplexed, e.g., in case of MPEG2-PS which manages MPEG2-PS data, the media information atom includes a base general media information header atom (type name "gmhd"), in lieu of vmhd.

The data information atom includes a data reference atom (type name "dref") in which information relating to a storage method, a place and a file name of actual data to be referred is described.

The sample table atom is configured by a sample description atom (type name "stsd") in which information relating to a compression method relating to each sample and its characteristic is described, a time-to-sample atom (type name "stts") in which a relation of each sample and time is described, and a sample size atom (type name "stsz") in which data quantity of each sample is described, a sample-to-chunk atom (type name "stsc") in which a relation of a chunk and a sample which configures the chunk is described, and a chunk offset atom (type name "stco") in which a head position of each chunk from a head of a file is described.

On one hand, in Movie Data Atom, for example, elementary streams of video data and audio data which are actual data of a QT file are assigned to chunks, as aggregates of respective samples, and a chunk of the elementary stream of video data and a chunk of the elementary stream of audio data are formed alternately.

Concretely speaking, Movie Data Atom is storing audio data which was encoded by a compression encoding method based on for example, MPEG1 Audio Layer2 by the audio encoder 12, video data which was encoded by a compression encoding method in conformity with for example, a MPEG2 Video standard by the video encoder 11, or graphic data (video data) such as JPEG and PNG by a chunk which is configured by a given number of samples, respectively.

Meanwhile, in the QT file, there is no restriction to the above-described encoding method, and for example, it is possible to apply various moving image data such as Motion JPEG, Motion JPEG 2000, MPEG4, and AVC (Advanced Video Coding: MPEG4-Part10) to video data of the QT file, and it is also possible to apply audio data such as Dolby AC3, and ATRAC (Adaptive Transform Acoustic Coding) to audio data of the QT file, and further, it is all right even if linear data, to which a compression encoding method is not applied, is applied.

Next, a configuration example of the QT file, in which editing of combining two graphic data 1 (Video2) and graphic data 2 (Video3) was applied to video data (Video1) of the QT file which is configured as above, will be described.

FIGS. 4 through 6 show configuration examples of the QT file to which the invention was applied. Meanwhile, FIGS. 4 through 6 show QT format file configuration examples by description of C language, together with a type name which is set up to each atom respectively, and audio data in the example of FIG. 3 is omitted.

In addition, the QT file in FIGS. 4 through 6 is simply different from the QT file which was described above with reference to FIG. 3, on a point of actual data which is managed by a track atom and number of track atoms, and a configuration etc. of each track atom is the same as that of FIG. 3, and therefore, its explanation will be arbitrarily omitted since it becomes repetitive.

In case of the QT file in FIGS. 4 through 6, editing of combining two graphic data 1 (Video2) and graphic data 2 (Video3) is applied to video data (Video1) and thereby, in Movie Atom, in addition to a track atom (Video1 (moving image management information)) of a video track 1 for managing video data shown at lines 3 through 26 of FIG. 4, a track atom (Video2 (Graphic1 management information)) of a video track 2 shown at line 27 of FIG. 4 through line 13 of FIG. 5, and a track atom (Video3 (Graphic2 management information)) of a video track 3 shown at lines 14 through 37 of FIG. 5 are generated, and further, a track atom of a graphic display control track (hereinafter, referred also to as GRDC track) for managing display control data of graphic data shown at lines 1 through 24 of FIG. 6 is newly generated.

Concretely explaining, the track atom of the video track 1 is a track for managing video data which is stored in Movie Data Atom and configured by moving image data such as MPEG4 Video, and as video media, a media type is defined, and therefore, it is configured in the same manner as a track atom of a video track of FIG. 3, and in the video track 1, information relating to video data which becomes a management object is described.

The track atom of the video track 2 is a track for managing video data which is stored in Movie Data Atom and configured by graphic data 1 such as PNG, and as video media, a media type is defined, and therefore, it is configured in the same manner as the track atom of the video track of FIG. 3, and in the video track 2, information relating to video data (graphic data 1) which becomes a management object is described.

The track atom of the video track 3 is a track for managing video data which is stored in Movie Data Atom and configured by graphic data 2 such as PNG, in the same manner as the video track 2, and as video media, a media type is defined, and therefore, it is configured in the same manner as the track atom of the video track of FIG. 3, and in the video track 3, information relating to video data (graphic data 2) which becomes a management object is described.

A track atom of the GRDC track is a track which is stored in Movie Data Atom for managing a GRDC sample which is display control data of the graphic data 1 which is managed by the track atom of the video track 2 and the graphic data 2 which is managed by the track atom of the video track 3, and in the same manner as the video track, as video media, a media type is defined, and therefore, it is configured in the same manner as the track atom of the video track of FIG. 3.

That is, in the track atom of the GRDC track, it is different on such a point that a management object is not video data but GRDC sample, and as to others, in the same manner as the track atom of the video track of FIG. 3, it is configured after an edit atom including a track header atom and an edit list atom, a media atom, and a sample table atom are formed.

The media atom, in the same manner as Video Data Atom of FIG. 3, is configured after a media header atom, a media handler atom, and a media information atom are formed, and the sample table atom, in the same manner as Video Data Atom of FIG. 3, is configured after a sample description atom, a time-to-sample atom, a sample size atom (type name "stsd"), a sample-to-chunk atom, and a chunk offset atom are formed.

The GRDC sample, which is managed by a GRDC track, is stored in Movie Data Atom, and is display control information of one or more graphic data with respect to each sample. That is, the GRDC sample is, although it will be described later in detail with reference to FIG. 8, configured by a plurality of entries of the number (1 or more) of graphic data for displaying two information of "track ID" of a video track for managing information relating to graphic data as a display control object (in this case, video tracks 2 and 3) and "display position (coordinate)" where graphic data is displayed, as one entry, during a period of sample reproduction time, and stored in Movie Data Atom.

That is, from the GRDC sample which is managed by the GRDC track, management information relating to graphic data which is described in the video track 2 or 3 identified by track ID is referred. The management information of graphic data which is referred from the GRDC sample is substantive information of graphic data such as "file name", "data format (PNG or JPEG etc.)", "display size", and "data size" of graphic data.

For example, in case that graphic data 1, which is managed by the video track 2, is a display object, Track Header Atom (type name "tkhd") at line 28 of FIG. 4 is referred from the GRDC sample, and "track ID" of the video track 2 is identified, and therefore, among information described in the video track 2, substantive information of the graphic data 1 such as "file name" of the graphic data 1 which is described in Data Reference Atom (type name "dref") at line 2 of FIG. 5, "data format (PNG, GIF etc.)" and "display size" which are described in Sample Description Atom (type name "stsd") at Line 5, "data size" which is described in Sample Size Atom (type name "stsz") at line 7, or "sample offset value" which is described in Chunk Offset Atom (type name "stco") at line 9 is referred.

In addition, in case that the graphic data 2, which is managed by the video track 3 is a display object, Track Header Atom (type name "tkhd") at line 15 of FIG. 5 is referred from the GRDC sample, and "track ID" of the video track 3 is identified, and therefore, among contents described in the video track 3, substantive information of the graphic data 2 such as "file name" of the graphic data 2 which is described in Data Reference Atom (type name "dref") at line 26, "data format (PNG, GIF etc.)" and "display size" which are described in Sample Description Atom (type name "stsd") at Line 29, "data size" which is described in Sample Size Atom (type name "stsz") at line 31, or "sample offset value" which is described in Chunk Offset Atom (type name "stco") at line 33 is referred.

As above, display control information with respect to each sample, of graphic data which is combined with video data managed by the video track 1 is generated as display control data (GRDC sample), separately from substantive information (management information) of graphic data necessary for reproducing graphic data, and stored in Movie Data Atom, and managed by another track (GRDC track) which is different from a track of substantive information (management information) of graphic data (video tracks 1 and 2).

Next, with reference to FIG. 7, the QT file of FIGS. 4 through 6 will be described in detail. Meanwhile, the QT file of FIG. 7 is one which was prepared so as to realize such a matter that reproduction is started at time t0 and reproduction is finished at time t15.

An example of FIG. 7 shows, sequentially from a top, along passage of time, video data which is managed by a track atom of the video track 1 and reproduced, graphic data 1 (ABCD0001.PNG) which is managed by a track atom of the video track 2 and reproduced, graphic data 2 (ABCD0002.PNG) which is managed by a track atom of the video track 3 and reproduced, graphic data 1 or 2 which is displayed by the display 41, and a GRDC sample which is managed by a track atom of the GRDC track and reproduced.

In the video track 1 (track ID: 1), information relating to video data which is configured by moving image data such as MPEG4 Video which is stored in Movie Data Atom, i.e., information necessary for reproducing target moving image data at time t0 through time t15, in case of the example of FIG. 7 is managed with respect to each sample. Meanwhile, a separation, which is shown in the video track 1, represents conceptually moving image data with respect to each sample.

In the video track 2 (track ID: 2), information relating to video data which is stored in Movie Data Atom and configured by the graphic data 1 (ABCD0001.PNG) is managed with respect to each sample. That is, in the video track 2, a sample 1 manages reproduction of the graphic data 1 at time t1 through time t7, and a sample 2 manages reproduction of the graphic data 1 at time t14 through time t15. Meanwhile, in mute at time t0 through time t1 and at time t7 through time t14, reproduction of the graphic data 1 in the video track 2 is not managed. That is, it represents that the graphic data 1 is not reproduced during a period of those time.

In the video track 3 (track ID: 3), information relating to video data which is stored in Movie Data Atom and configured by the graphic data 2 (ABCD0002.PNG) is managed with respect to each sample. That is, in the video track 3, a sample 1 manages reproduction of the graphic data 2 at time t8 through time t13, and a sample 2 manages reproduction of the graphic data 2 at time t14 through time t15. Meanwhile, in mute at time t0 through time t8 and at time t13 through time t14, reproduction of the graphic data 2 in the video track 3 is not managed. That is, it represents that the graphic data 2 is not reproduced during a period of those time.

In the GRDC track (graphic display control track), information relating to GRDC samples G1 through G12 stored in Movie Data Atom is managed with respect to each sample. The GRDC sample, which is managed by the GRDC track, is configured by a plurality of entries with only the number (1 or more) of graphic data in which "track ID" and "display position (coordinate)" are set to one entry and which is displayed during a period of sample reproduction time.

Concretely explaining, a sample 1 of the GRDC track manages a GRDC sample G1 which is display control data of the graphic data 1 at time t1 through time t2. The GRDC sample G1 is configured by an entry 1 of "track ID: 2" and "display position x1, y1".

That is, the recording and reproducing apparatus 1 obtains such information that the number of graphic data to be displayed is 1 and its display position is "display position x1, y1", from the entry number 1 of the GRDC sample G1. In addition, the recording and reproducing apparatus 1 obtains the sample 1 of the video track 2, which should be reproduced at the same time as the sample 1 of the GRDC track, in the video track 2, by referring "track ID: 2" of the GRDC sample G1 to access to the video track 2, from the sample 1 of the GRDC track. Therefore, the recording and reproducing apparatus 1 can refer substantive information of the graphic data 1 (ABCD0001.PNG) which is managed by the sample 1 of the video track 2, on the basis of "track ID: 2" of the GRDC sample G1.

By this means, on the display 41 at time t1 through time t2, the graphic data 1 (ABCD0001.PNG), which is managed by the sample 1 of the video track 2 of "track ID: 2" at time t1 through time t2, is overlapped with moving image data which is managed by the video track 1, at "display position x1, y1", and displayed. Meanwhile, in the example of FIG. 7, display of moving image data on the display 41 is omitted.

A sample 6 of the GRDC track manages a GRDC sample G6 which is display control data of the graphic data 1 at time t6 through time t7. The GRDC sample G6 is configured by an entry 1 of "track ID:2" and "display position x1, y1", an entry 2 of "track ID:2" and "display position x2, y2", an entry 3 of "track ID:2" and "display position x3, y3", an entry 4 of "track ID:2" and "display position x4, y4", an entry 5 of "track ID:2" and "display position x5, y5", and an entry 6 of "track ID:2" and "display position x6, y6".

Therefore, on the display 41 at time t6 through t7, the graphic data 1 (ABCD0001.PNG), which is managed by the sample 1 of the video track 2 of "track ID: 2" at time t6 through time t7, is overlapped with moving image data which is managed by the video track 1, with only entry number (6) at "display position x1, y1", "display position x2, y2", "display position x3, y3", "display position x4, y4", "display position x5, y5", and "display position x6, y6", and displayed.

Meanwhile, as to the samples 2 through 5 of the GRDC track at time t2 through time t6, entry number is different from that of the case of the sample 1 or 6, but a basic configuration of each entry is almost the same, and therefore, graphic representation and explanation are omitted, but for example, explaining about the sample 2 of the GRDC track, the sample 2 of the GRDC track manages a GRDC sample 2 which is display control information of the graphic data 2 at time t2 through time t3, and the GRDC sample G2 is configured by an entry 1 of "track ID: 2" and "display position x1, y1" and an entry 2 of "track ID: 2" and "display position x2, y2".

Therefore, on the display 41 at time t2 through time t3, the graphic data 1 (ABCD0001.PNG), which is managed by the sample 1 of the video track 2 of "track ID: 2" at time t2 through time t3, is overlapped with moving image data which is managed by the video track 1 only with entry number (2) at "display position x1, y1" and "display position x2, y2", and displayed.

That is, at time t1 through time t7 of the example in FIG. 7, display of the graphic data 1 is controlled in such a manner that the graphic data 1 (ABCD0001.PNG) is increased one by one, every time of passage of time and displayed on the display 41.

Meanwhile, each sample of the video track 2 has to be synchronized with a sample of the GRDC track in terms of time. For example, in the GRDC samples of the samples 1 through 6 of the GRDC track, all are of "track ID: 2", and therefore, start time and continuation time of the samples 1 through 6 of the GRDC track have to be equivalent to start time and continuation time of the sample 1 of the video track 2. This is applied to a sample of the video track 3, in the same manner, which will be described below.

In addition, the sample 7 of the GRDC track manages a GRDC sample G7 which is display control data of the graphic data 2 at time t8 through time t9. The GRDC sample G7 is configured by an entry 1 of "track ID: 3" and "display position x1, y1".

That is, the recording and reproducing apparatus 1 can refer substantive information of the graphic data 2 (ABCD0002.PNG) which is managed by a sample 1 of the video track 3 of "track ID: 3", in the same manner as the case of the graphic data 1, by referring a sample 1 of "track ID: 3", on the basis of a sample 7 of the GRDC track.

Therefore, on the display 41 at time t8 through time t9, the graphic data 2 (ABCD0002.PNG), which is managed by a sample 1 of the video track 3 of "track ID: 3" at time t8 through time t9, is overlapped with moving image data which is managed by the video track 1, at "display position x1, y1", and displayed.

A sample 11 of the GRDC track manages a GRDC sample G11 which is display control data of the graphic data 2 at time t12 through time t13. The GRDC sample G11 is configured by an entry 1 of "track ID: 3" and "display position x1, y1", an entry 2 of "track ID: 3" and "display position x2, y2", an entry 3 of "track ID: 3" and "display position x3, y3", an entry 4 of "track ID: 3" and "display position x4, y4", and an entry 5 of "track ID: 3" and "display position x5, y5".

Therefore, on the display 41 at time t12 through time t13, the graphic data 2 (ABCD0002.PNG), which is managed by a sample 1 of the video track 3 of "track ID: 3" at time t12 through time t13, is overlapped with moving image data which is managed by the video track 1, with only entry number (5) at "display position x1, y1", "display position x2, y2", "display position x3, y3", "display position x4, y4", and "display position x5, y5", and displayed.

Meanwhile, as to samples 8 through 10 of the GRDC track at time t9 through time t12, entry number is different from that of the case of a sample 7 or 11, but a basic configuration of each entry is almost the same, and therefore, its graphic representation and explanation are omitted, but, for example, explaining about the sample 8 of the GRDC track, the sample 8 of the GRDC track manages a GRDC sample G8 which is display control information of the graphic data 2 at time t9 through time t10, and the GRDC sample G8 is configured by an entry 1 of "track ID: 3" and "display position x1, y1" and an entry 2 of "track ID: 3" and "display position x2, y2".

Therefore, on the display 41 at time t9 through time t10, the graphic data 2 (ABCD0002.PNG), which is managed by a sample 1 of the video track 3 of "track ID: 3" at time t9 through time t10, is overlapped with moving image data which is managed by the video track 1, with only entry number (2) at "display position x1, y1" and "display position x2, y2", and displayed.

That is, at time t8 through time t13 in the example of FIG. 7, display is controlled in such a manner that the graphic data 2 (ABCD0002.PNG) is increased one by one, every time of passage of time and displayed on the display 41.

Further, a sample 12 of the GRDC track manages a GRDC sample 12 which is display control information of the graphic data 1 and 2 at time t14 through time t15. The GRDC sample G12 is configured by an entry 1 of "track ID: 2" and "display position x1, y1" and an entry 2 of "track ID: 3" and "display position x2, y2".

Therefore, on the display 41 at time t14 through time t15, the graphic data 1 (ABCD0001.PNG), which is managed by a sample 2 of the video track 2 of "track ID: 2" at time t14 through time t15, is overlapped with moving image data which is managed by the video track 1 at "display position x1, y1" and displayed, and further, the graphic data 2 (ABCD0002.PNG), which is managed by a sample 2 of the video track 3 of "track ID: 3", is overlapped one by one for each (only entry number (2)) at "display position x2, y2", and displayed.

Meanwhile, in mute at time t0 through time t1, time t7 through time t8 and time t13 through time t14, a GRDC sample (i.e., display control data of graphic data) is not managed in the GRDC track. That is, as shown in "(Non)", it represents that graphic data is not displayed on the display 41.

Specification of number, type or display position of graphic data which is displayed in the manner described above is carried out depending on an operation etc. of the operation input section 43 by a user for carrying out such editing that, for example, graphic data is combined with moving image data which is recorded in the optical disk 2.

As above, in the QT file, management information (substantive information) of graphic data is managed by a video track, and display control data (GRDC sample) of graphic data is managed by one GRDC track, and thereby, it is possible to display graphic data by changing its display position, without increasing a video track, and also to display the same graphic data at the same time by changing its position, without increasing a video track.

Therefore, such a track number that 12 pieces are necessary in case of a conventional method of listing tracks of only necessary numbers by use of Matrix information in tkhd (Track Header) atom of a video track, can be configured by total 3 pieces of two tracks for managing management information of graphic data 1 and 2 respectively, and only one GRDC track for managing display control data (GRDC sample) of graphic data, in the example of FIG. 7, and therefore, it is possible to reduce quite a lot of track numbers.

Further, by reducing the track number, it is possible to reduce a resource (memory capacity) etc. of software and hardware for reading out a file, analyzing Movie Atom, and carrying out display control.

In addition, since information necessary for display control is uniformly managed in a GRDC track, processing algorithm of software and hardware for analyzing Movie Atom and carrying out display control is simplified, and therefore, it leads to an advantage of suppressing probability of bug occurrence due to processing algorithm.

Meanwhile, in the example of FIG. 7, such a case that there are two graphic data was explained, but the graphic data may be 3 or more, and there is no restriction as to the number of graphic data. In this case, it is realized by increasing the number of entries and the number of video tracks, in one sample in a GRDC sample, only by desired graphic data number.

FIG. 8 shows a format example of the GRDC sample of FIG. 7. Meanwhile, in an example of FIG. 8, bit number of each field of format syntax is represented by Mnemonic of an unsigned integral value (unit).

"Graphic Parts Control Sample" at line 1 represents that it is a GRDC sample. A head of a GRDC sample shown at line 2 is a 16 bit "number_of_entries" field and represents an entry number included in a sample. Information of each entry is stored in lines 5 through 7 below a "for" loop at line 4.

An entry is configured by a "Track_ID" (32 bits) field in which track ID is stored, a "Display_Position_X" (16 bits) field in which X coordinate of a display position is stored, and a "Display_Position_Y" (16 bits) field in which Y coordinate of a display position is stored, and in case that there are a plurality of entries, these information is described repeatedly.

Meanwhile, in the example of FIG. 7, it was explained that the GRDC sample is stored in Movie Data Atom, but there is not necessarily such a necessity that it is stored in Movie Data Atom as a self-internal capsule type, and for example, it may be stored in an outside (e.g., Movie Data Atom of another file) as an external reference type.

Next, with reference to FIG. 9, editing/recording processing of the recording and reproducing apparatus 1 will be described. Meanwhile, an example of FIG. 9 will explain about a case of carrying out editing which was described above with reference to FIG. 7.

The recording and reproducing apparatus 1 multiplexes elementary stream DV of video data and elementary stream DA of audio data, which are actual data inputted from an imaging section or a microphone etc. which are not shown in the figure, by use of the file generator 15, and records it on the optical disk 2, and records Movie Data Atom sequentially. In addition, the recording and reproducing apparatus 1 obtains management information sequentially, depending on a record of this Movie Data Atom, and keeps it in a memory 15A of the file generator 15, and after recording completion of Movie Data Atom, has the file generator 15 generated Movie Atom by use of management information which was kept in the memory 15A, and records it on the optical disk 2.

In the manner described above, on the optical disk 2, video data and audio data as such an imaging result that they were inputted to the recording and reproducing apparatus 1 are recorded as a QT format file, and in addition, through a communication section which is not shown in the figure, from another information processing apparatus which is connected to LAN (Local Area Network) etc. or a server which is connected to Internet, various data such as video data, audio data, or graphic data, which was changed to a QT format file, is obtained and recorded on the optical disk 2.

For example, in order for a user to carry out editing of combining graphic data which is composed of PNG etc. obtained from another information processing apparatus that is not shown in the figure and recorded as a QT file, with video data which is recorded as a QT file and is an imaging result, a button etc., which configures the operation input section 43, are operated, and video data to be edited and graphic data 1 and 2 are selected out of data recorded in the optical disk 2.

The operation input section 43 outputs an instruction signal which corresponds to an operation of a user, to the system control microcomputer 19. The system control microcomputer 19 selects data (e.g., video data, and graphic data 1 and 2 of FIG. 7) as an object to be edited (editing object), in a step S11, depending on an instruction signal from the operation input section 43, and controls each section of the recording and reproducing apparatus 1, and displays an editing screen for editing the selected data, on the display 41.

That is, the system control microcomputer 19 generates data of the editing screen for editing the elected data, and supplies the generated editing screen data, to the file decoder 16. The file decoder 16 displays an editing screen which corresponds to the generated data, on the display 41, through the video decoder 13B and the graphic combining section 35.

A user operates a button etc. which configure the operation input section 43, overtaking a look at the editing screen which is displayed on the display 41, and carries out an editing instruction of data as an editing object, and carries out an instruction so as to record its editing result. The operation input section 43 outputs an instruction signal which corresponds to an operation of a user, to the system control microcomputer 19. The system control microcomputer 19 accepts an editing instruction, in response to the instruction signal from the operation input section 43, in a step S12, and it goes to a step S13.

The system control microcomputer 19 controls the file generator 15 in a step S13, and on the basis of the editing instruction and the editing object data, generates a track atom of a video track, and keeps the generated track atom of the video track in the memory 15A, and it goes to a step S14.

That is, the file generator 15 generates a track atom of a video track (e.g., video tracks 1, 2, and 3 of FIG. 7) for managing editing object data, on the basis of the editing instruction from the system control microcomputer 19, editing object data itself which is recorded on the optical disk 2, or Movie Atom of a QT file which manages the editing object data, in the step S13, and keeps the generated track atom of the video track in the memory 15A, once.

The system control microcomputer 19 controls the file generator 15 in a step S14, and on the basis of the editing instruction and the track atom of the video track which was generated in the step S14, generates a GRDC sample of Movie Data Atom, and it goes to a step S15.

That is, the file generator 15 generates, for example, GRDC samples G1 through G12 of FIG. 7 which are configured by one or more entries being composed of "track ID" and "display position", on the basis of the editing instruction from the system control microcomputer 19 and the track atom of the video track which was generated in the step S13, in the step S14, and outputs data of the generated GRDC samples G1 through G12, to the memory controller 18, and it goes to a step S15.

The system control microcomputer 19 controls each section of a recording system such as the memory controller 18, in the step S15, and records the GRDC samples G1 through G12 which were generated by the file generator 15, on the optical disk 2, as data of Movie Data Atom, and it goes to a step S16.

That is, data of the generated Movie Atom passes through the memory controller 18, the error correction code/decoder 21, and the data modem 32, sequentially, and is recorded on the optical disk 2 by the optical pickup 33, or the optical pickup 33 and magnetic field head 32.

By this means, on the optical disk 2, Movie Data Atom of a QT file to be generated is recorded. Meanwhile, in an example of FIG. 9, video data as an editing object, graphic data 1 and 2 are managed as Movie Data Atom of another QT file which is recorded on the optical disk 2, and are referred externally, and therefore, they are not recorded as Movie Data Atom of this QT file.

In addition, the system control microcomputer 19 controls the file generator 15, and on the basis of the GRDC sample generated in the step S14, generates a track atom of a GRDC track in a step S16, and keeps the generated track atom of the GRDC track in the memory 15A once, and it goes to a step S17, and it generates Movie Atom by use of each track atom etc. which are kept in the memory 15A once, and it goes to a step S18.

That is, the file generator 15 generates a movie header atom, in the step S17, and generates Movie Atom which is configured by the movie header atom which was generated, as described above with reference to FIGS. 4 through 6, track atoms of video tracks 1 through 3 which were generated in the step S13, and a track atom of a GRDC track which was generated in the step S16, and outputs data of the generated Movie Atom, to the memory controller 18. That is, by this means, a QT file is generated.

The system control microcomputer 19 controls each section of a recording system such as the memory controller 18 in the step S18, and records data of Movie Atom which was generated by the file generator 15, on the optical disk 2. That is, data of the generated Movie Atom passes through the memory controller 18, the error correction code/decoder 21, and the data modem 32, sequentially, and is recorded on the optical disk 2 by the optical pickup 33, or the optical pickup 33 and the magnetic field head 32, and editing/recording processing of data of a QT file is completed.

In the manner described above, data of a QT file which is recorded on the optical disk 2 is edited, and it editing result is recorded as a QT file on the optical disk 2.

Figure 9:
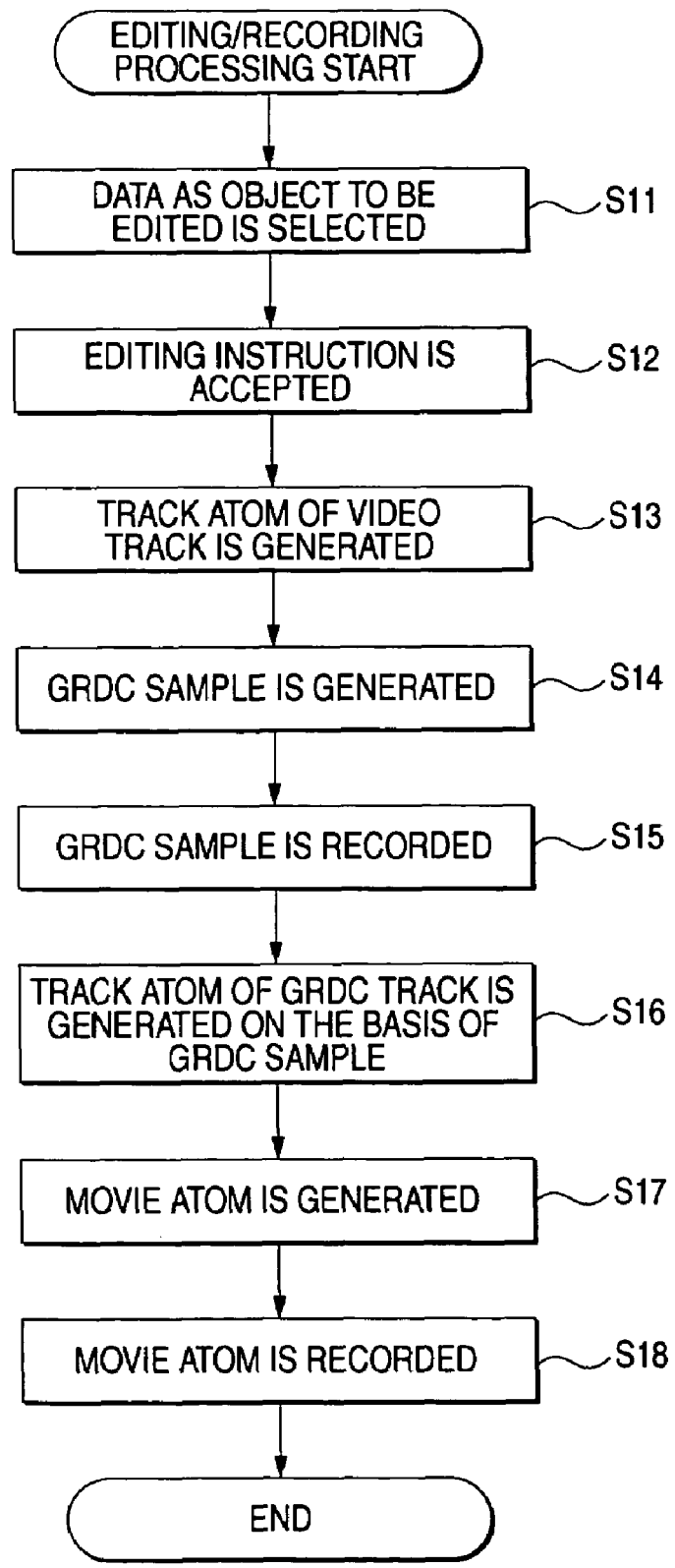
FIG. 9 is a flow chart which explains editing and recording processing of a recording and reproducing apparatus 1 of FIG. 1.

Meanwhile, in the example of FIG. 9, a GRDC sample of a QT file which was generated and recorded is self-capsuled internally as Movie Data Atom, and video data, graphic data 1 and 2 are managed as Movie Data Atom of another QT file which is recorded on the optical disk 2, and therefore, it was described so as to be referred externally, but a QT file may be configured in such a manner that a GRDC sample is recorded on a place other than its own Movie Data Atom to realize external reference, and a QT file may be configured so as to self-capsule video data, graphic data 1 and 2 internally.

Figure 10:
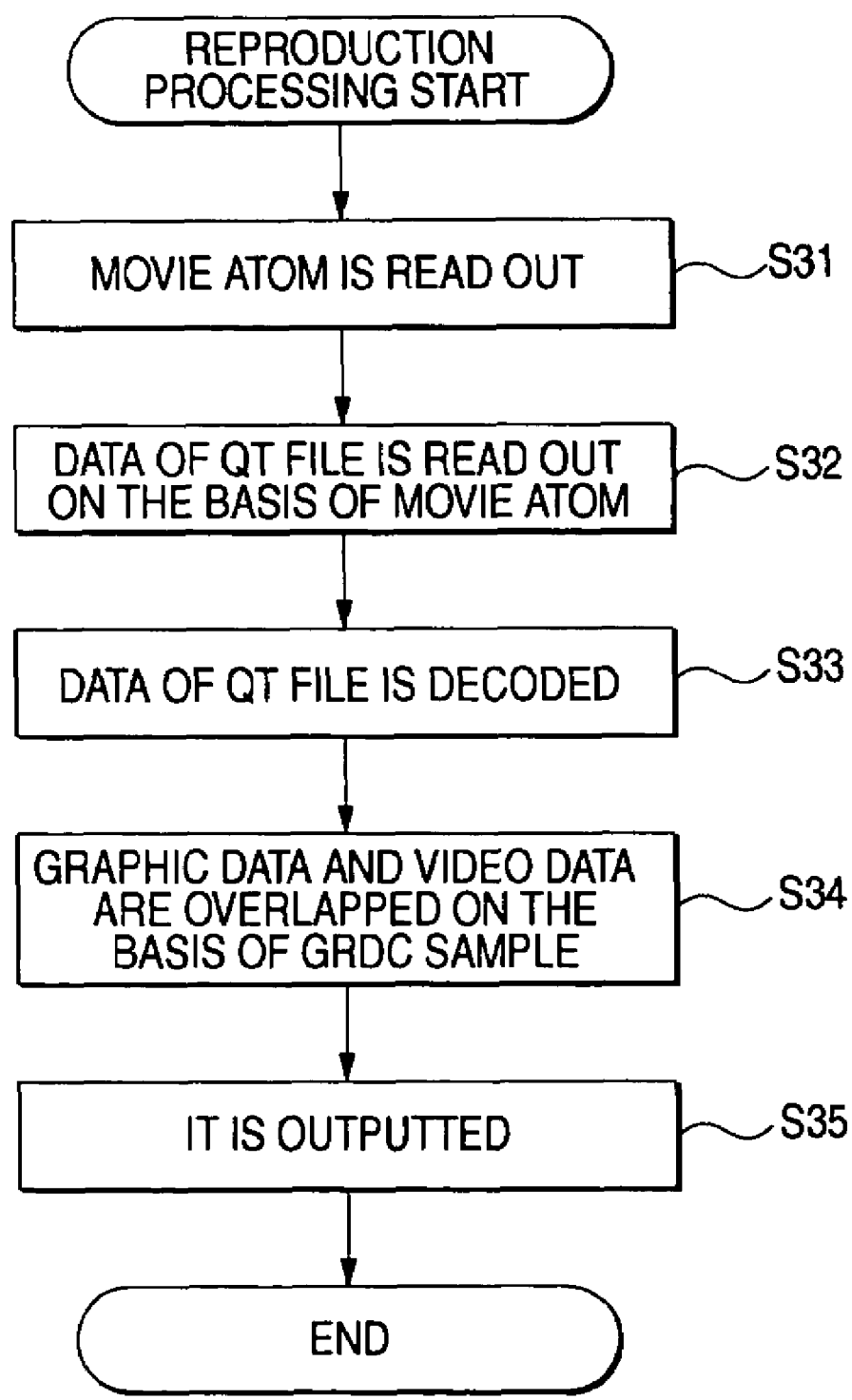
FIG. 10 is a flow chart which shows reproducing processing of the recording and reproducing apparatus 1 of FIG. 1.

Next, with reference to a flow chart of FIG. 10, reproduction processing for reproducing data of a QT file which was recorded on the optical disk 2 by the above-described editing/recording processing will be described.

The operation input section 43 outputs an instruction signal of data reproduction which corresponds to an operation of a user, to the system control microcomputer 19. The system control microcomputer 19 controls each section of a reproducing system of the recording and reproducing apparatus 1, in a step S31, and reads out Movie Atom of a file depending on the instruction signal from the operation input section 43, from the optical disk 2.

That is, a reproduction signal, which is obtained by the optical pickup 33, is processed by the data modem 23, and thereby, reproduction data is obtained, and it is processed by the error correction code/decoder 21, and data of Movie Atom of a QT format, which was recorded on the optical disk 2, is reproduced. Then, data of the reproduced Movie Atom is outputted to the file decoder 16 and the system control microcomputer 19, through the memory controller 18. Data of Movie Atom is temporarily held in a memory which is not shown in the figure, in the file decoder 16 and the system control microcomputer 19.

The system control microcomputer 19 controls each section of the reproducing system of the recording and reproducing apparatus 1, in a step S32, and reads out data of a QT file which is managed by managing information, from the optical disk 2, on the basis of each management information of Movie Atom, and supplies it to the system control microcomputer 19 or the file decoder 16, and it goes to a step S33.

That is, for example, from Movie Data Atom of this QT file, the GRDC samples G1 through G12 etc. of FIG. 7 are read out, and the GRDC samples G1 through G12 which were read out are supplied to the system control microcomputer 19 through the memory controller 18. In addition, from Movie Data Atom of another QT file, video data which is managed in the video track 1 of FIG. 7, graphic data 1 which is managed in the video track 2, and graphic data 2 which is managed in the video track 3 are read out, and data which was read out, is supplied to the file decoder 16 through the memory controller 18.

The file decoder 16 outputs an elementary stream of video data, out of a QT file, to the video decoder 13A, on the basis of each management information of Movie Atom, in a step S33, and the video decoder 13A decompresses data of an elementary stream of video data from the file decoder 16, and outputs it to the graphic combining section 35. In addition, the file decoder 16 outputs graphic data, out of a Qt file, to the video decoder 13B, on the basis of management information of Movie Atom, and the video decoder 13B decompresses graphic data from the file decoder 16, and outputs it to the graphic combining section 35, and it goes to a step S34.

The system control microcomputer 19 controls the graphic combining section 35, on the basis of track ID and display position information of each entry of a GRDC sample from the memory controller 18, in the step S34, and overlaps video data from the video decoder 13A and graphic data from the video decoder 13B, and it goes to a step S35.

In the step S35, the graphic combining section 35 outputs the overlapped data to the display 41.

Explaining processing of these steps S34 and S35 in detail with reference to the above-described FIG. 7, the system control microcomputer 19 knows from the entry number 1 of the GRDC sample G1, that the number of graphic data to be displayed is 1, and its display position is "display position x1, y1". In addition, the system control microcomputer 19 obtains a sample 1, which should be reproduced at the same time as a sample 1 of the GRDC track, in the video track 2, by referring "track ID: 2" of the GRDC sample G1, from a sample 1 of the GRDC track to access to the video track 2. Therefore, the system control microcomputer 19 can refer substantive information of the graphic data 1 (ABCD0001.PNG) which is managed by a sample 1 of the video track 2 of "track ID: 2".

By this means, data to be displayed and a display position of the data are instructed to the graphic combining section 35 from the system control microcomputer 19, and therefore, on the display 41 at time t1 through time t2, the graphic data 1 (ABCD0001.PNG), which is managed by a sample 1 of "track ID: 2" at time t1 through time t2, is overlapped with moving image data which is managed by the video track 1 at "display position x1, y1", and displayed.

As above, it was configured in such a manner that a display position of graphic data, and identification information of management information of the graphic data are uniformly managed separately, as display control information of the graphic data, separately from management information for reproducing the graphic data, and therefore, it is suppressed that a track for managing management information of graphic data is increased by an editing work.

By this means, for example, in case of desiring to change a display position of graphic data, it is possible to easily edit it, and further, since a necessity to decode graphic data a number of times is eliminated, it becomes possible to easily reproduce it.

Further, management information for reproducing graphic data is the same as the configuration of a conventional QT format. Therefore, in case that a recording and reproducing apparatus, which does not correspond to a graphic display control track (GRDC track) of the invention, reproduced a QT file which was prepared by use of the GRDC track of the invention, a display position of the graphic data is not controlled, but it is possible to reproduce other data. By this means, even a recording and reproducing apparatus, which does not corresponds to the GRDC track can check what kind of graphic data is used.

Meanwhile, in the above-described explanation, it was described as to the case of recording data by a QT file, but the invention is not limited t this, and for example, it is possible to widely apply it to a recording apparatus and a reproducing apparatus of a file of the same configuration as that of the QT file, such as an ISO Base Media file format based on the QT format (MPEG4-part12), a Motion JPEG2000 (MJ2) file format, and an AVC file format.

In addition, in the above-described explanation, it was described as to the case of recording a QT file on an optical disk, but the invention is not limited to this, and it is possible to widely apply it to a case of recording it on various recording media such as a magnetic disk and a memory card.

Further, in the above-described explanation, it was described as to such a case that the invention was applied to a recording and reproducing apparatus, but the invention is not limited to this, and it is possible to widely apply it to a portable telephone having an imaging function, PDA (Personal Digital Assistants), what is more, a server for recording an imaging result which is obtained, by wire, by wireless, etc., i.e., various recording apparatuses for recording video data, and what is more, various apparatuses for applying editing processing to a video data file such as an imaging result, like a personal computer.

The above-described series of processing can be executed by hardware, but can be also executed by software. In this case, for example, the recording and reproducing apparatus of FIG. 1 is configured by a personal computer 101 as shown in FIG. 11.

Figure 11:
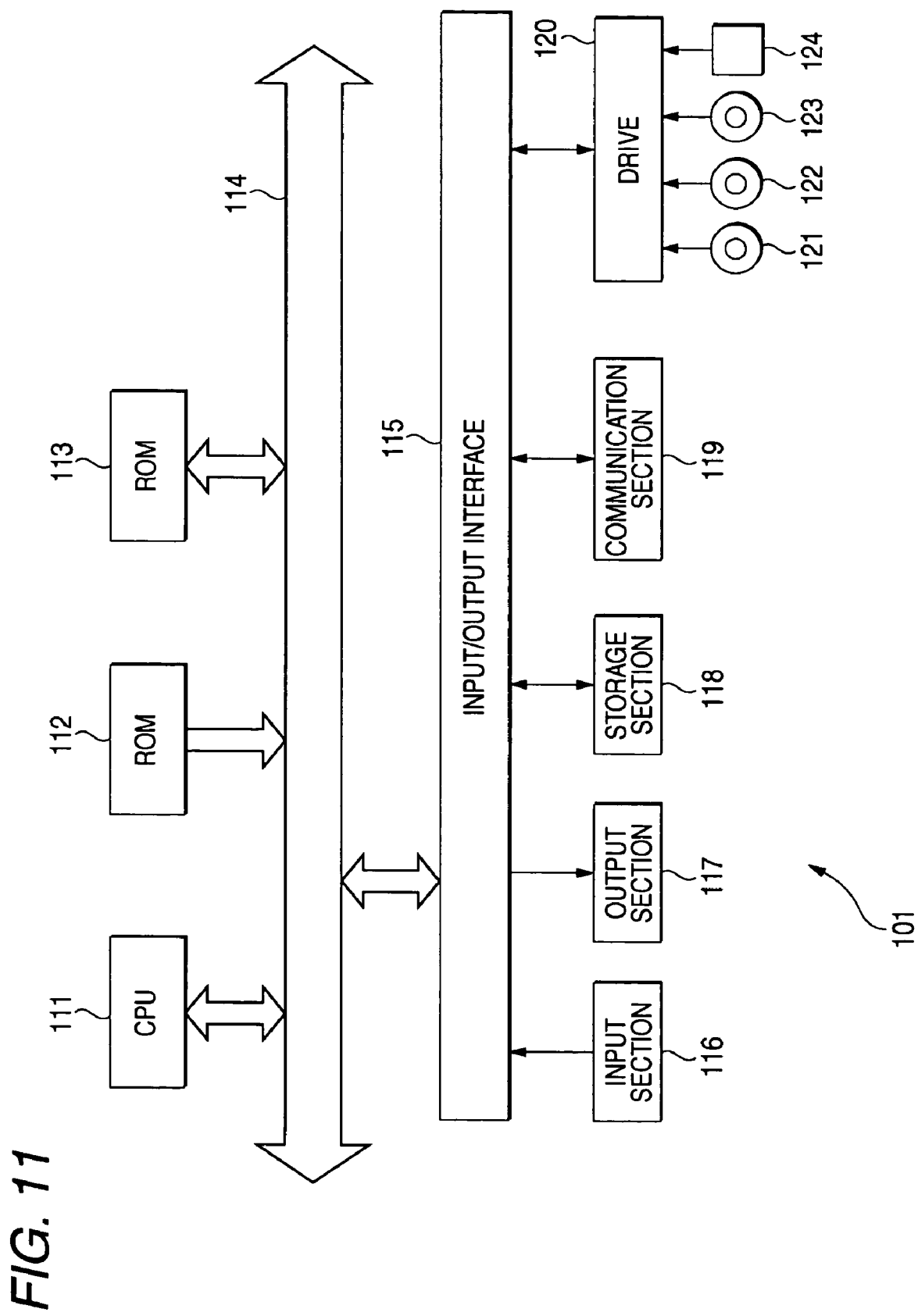
FIG. 11 is a block diagram which shows a configuration example of a personal computer to which the invention is applied.

In FIG. 11, CPU (Central Processing Unit) 111 executes various processing in accordance with a program which is stored in ROM (Read Only Memory) 112, or a program which was loaded from a storage section 118 to RAM (Random Access Memory) 113. In RAM 113, data etc., which are necessary on the occasion that CPU 111 executes various processing, are stored arbitrarily.

CPU 111, ROM 112, and RAM 113 are mutually connected through a bus 114. To this bus 114, an input/output interface 115 is also connected.

To the input/output interface 115, an input section 116 which is composed of a keyboard, a mouse etc., a display which is composed of CRT (Cathode Ray Tube), LCD (Liquid Crystal Display) etc., an output section 117 which is composed of a speaker etc., a storage section 118 which is configured by a hard disk etc., and a communication section 119 which is configured by a modem, a terminal adapter etc. are connected. The communication section 119 carries out communication processing through a network such as wireless.

To the input/output interface 115, a drive 120 is also connected according to need, and a magnetic disk 121, an optical disk 122, a magneto optical disk 123, or a semiconductor memory 124 etc. is loaded arbitrarily, and a computer program, which was read out therefrom, is installed in the storage section 118 according to need.

In case of executing a series of processing by use of software, a program, which configures the software, is installed, from a network and a storage medium, to a computer which is incorporated into dedicated hardware, or for example, a general-purpose personal computer etc. which is capable of executing various functions by installing various programs.

This recording medium is configured not only by a package medium which is composed of a magnetic disk 121 (including flexible disk), an optical disk 122 (including CD-ROM (Compact Disk-Read Only Memory) and DVD (Digital Versatile Disk)), a magneto optical disk 123 (including MD (Mini-Disk) (trademark)), or a semiconductor memory 124, which stores a program which is distributed for providing the program to a user, separately from an apparatus main body, as shown in FIG. 11, but also by ROM 112 which stores a program which is provided to a user in such a state that it was incorporated in an apparatus main body in advance, a hard disk which is included in the storage section 118, etc.

Meanwhile, in this specification, steps shown in the flow charts include not only processing which is carried out in chronological order in accordance with the described order, but also processing which is executed in parallel or individually, even if it is not necessarily processed in chronological order.

What is claimed is:

1. A recording apparatus for editing data and recording edited data as a file, comprising:
 a file generator circuit generating a file, the file comprising:
  a management information block having an image management track, the image management track storing management information used to reproduce a selected sample of image data, the image data comprising samples, recorded in a sequence over a time period, wherein the sample is selected based on a predetermined unit of the time period and independent of the recorded sequence, the predetermined unit corresponding to a recorded time of the selected sample;
  an identifier of the image management track;
  a display control track for storing management information of display control data, wherein the display control data indicates a display position of the selected sample in relation to the image data; and
  a data block, blocked separately from the management information block, capable of storing data managed by the management information block;
 a computer-readable storage medium; and
 a system controller microcomputer recording the generated file in the computer-readable storage medium.

2. The recording apparatus as set forth in claim 1, wherein the display control data is stored in the data block.

3. A recording method for editing data and recording edited data as a file, comprising:
generating a file, the file comprising:
a management information block having an image management track, the image management track storing management information used to reproduce a selected sample of image data, the image data comprising samples, recorded in a sequence over a time period, wherein the sample is selected based on a predetermined unit of the time period and independent of the recorded sequence, the predetermined unit corresponding to a recorded time of the selected sample;
an identifier of the image management track;
a display control track for storing management information of display control data, wherein the display control data indicates a display position of the selected sample in relation to the image data; and
a data block, blocked separately from the management information block, capable of storing data managed by the management information block; and
recording the generated file, in a recording medium.

4. A computer-readable storage medium, comprising a computer program, which when executed on a processor, causes the processor to perform a method of editing data and recording edited data as a file, the method comprising:
generating a file, the file comprising:
a management information block having an image management track, the image management track storing management information used to reproduce a selected sample of image data, the image data comprising samples, recorded in a sequence over a time period, wherein the sample is selected based on a predetermined unit of the time period and independent of the recorded sequence, the predetermined unit corresponding to a recorded time of the selected sample;
an identifier of the image management track;
a display control track for storing management information of display control data, wherein the display control data indicates a display position of the selected sample in relation to the image data; and
a data block, blocked separately from the management information block, capable of storing data managed by the management information block; and
recording the generated file, in a recording medium.

5. A reproducing apparatus for reproducing a file from a recording medium, comprising:
a memory controller reading out a file recorded on a recording medium, the file comprising:
a management information block having at least an image management track, the image management track storing management information used to reproduce a selected sample of image data, the image data comprising samples, recorded in a sequence over a time period, wherein the sample is selected based on a predetermined unit of the time period and independent of the recorded sequence, the predetermined unit corresponding to a recorded time of the selected sample;
an identifier of the image management track;
a display control track for storing management information of display control data, wherein the display control data indicates a display position of the selected sample in relation to the image data; and
a data block, blocked separately from the management information block, capable of storing data managed by the management information block; and
a display control section for controlling display of the selected sample, the selected sample being read out by the memory controller on the basis of display control data reproduced with reference to the display control track and reproducing the selected sample with reference to the image management track.

6. The reproducing apparatus as set forth in claim 5, wherein the display control data is stored in the data block.

7. A method for reproducing a file from a recording medium, comprising:
reading out a file recorded on a recording medium, the file comprising:
a management information block having at least an image management track, the image management track storing management information used to reproduce a selected sample of image data, the image data comprising samples, recorded in a sequence over a time period, wherein the sample is selected based on a predetermined unit of the time period and independent of the recorded sequence, the predetermined unit corresponding to a recorded time of the selected sample;
an identifier of the image management track;
a display control track for storing management information of display control data, wherein the display control data indicates a display position of the selected sample in relation to the image data; and
a data block, blocked separately from the management information block, capable of storing data managed by the management information block; and
controlling display of the selected sample, the selected sample being read on the basis of display control data reproduced with reference to the display control track and reproducing the selected sample with reference to the image management track.

8. A computer-readable storage medium, comprising a computer program, which when executed on a processor, causes the processor to perform a method of reproducing a file from a recording medium, the method comprising:
reading out a file recorded on a recording medium, the file comprising:
a management information block having at least an image management track, the image management track storing management information used to reproduce a selected sample of image data, the image data comprising samples, recorded in a sequence over a time period, wherein the sample is selected based on a predetermined unit of the time period and independent of the recorded sequence, the predetermined unit corresponding to a recorded time of the selected sample;
an identifier of the image management track;
a display control track for storing management information of display control data, wherein the display control data indicates a display position of the selected sample in relation to the image data; and
a data block, blocked separately from the management information block, capable of storing data which is managed by the management information block; and
controlling display of the selected sample, the selected sample being read out on the basis of display control data reproduced with reference to the display control track and reproducing the selected sample with reference to the image management track.

9. A recording and reproducing apparatus for editing data, recording edited data as a file, and reproducing a recorded file, comprising:

a file generator circuit generating a file, the file comprising:
- a management information block having at least an image management track, the image management track storing management information used to reproduce a selected sample of image data, the image data comprising samples, recorded in a sequence over a time period, wherein the sample is selected based on a predetermined unit of the time period and independent of the recorded sequence, the predetermined unit corresponding to a recorded time of the selected sample;
- an identifier of the image management track;
- a display control track for storing management information of display control data, wherein the display control data indicates a display position of the selected sample in relation to the image data; and
- a data block, blocked separately from the management information block, capable of storing data managed by the management information block;

a computer-readable storacje medium;
a system controller microcomputer recording the generated file in the computer-readable storage medium;
a memory controller for reading out the management information block from the computer-readable storage medium; and
a display control section for controlling display of the selected sample, the selected sample being read out by the reading section on the basis of display control data reproduced with reference to the display control track and reproducing the selected sample with reference to the image management track.

10. The recording and reproducing apparatus as set forth in claim 9, wherein the display control data is stored in the data block.

11. A recording and reproducing method which edits data, records edited data as a file, and reproduces a recorded file, comprising:
generating a file, the file comprising:
- a management information block having at least an image management track, the image management track storing management information used to reproduce a selected sample of image data, the image data comprising samples, recorded in a sequence over a time period, wherein the sample is selected based on a predetermined unit of the time period and independent of the recorded sequence, the predetermined unit corresponding to a recorded time of the selected sample;
- an identifier of the image management track;
- a display control track for storing management information of display control data, wherein the display control data indicates a display position of the selected sample in relation to the image data; and
- a data block, blocked separately from the management information block, capable of storing data managed by the management information block;

recording the generated file, in a computer-readable storage medium;
reading out the management information block from the recording medium; and
controlling display of the selected sample, the selected sample being read out on the basis of display control data reproduced with reference to the display control track and reproducing the selected sample with reference to the image management track.

12. A computer-readable storage medium, comprising a computer program, which when executed on a processor, causes the processor to perform a method of editing data, recording edited data as a file, and reproducing a recorded file, the method comprising:
generating a file, the file comprising:
- a management information block having at least an image management track, the image management track storing management information used to reproduce a selected sample of image data, the image data comprising samples, recorded in a sequence over a time period, wherein the sample is selected based on a predetermined unit of the time period and independent of the recorded sequence, the predetermined unit corresponding to a recorded time of the selected sample;
- a display control track for storing management information of display control data, wherein the display control data indicates a display position of the selected sample in relation to the image data; and
- a data block, blocked separately from the management information block, capable of storing data managed by the management information block;

recording the generated file, in a recording medium;
reading out the management information block from the recording medium; and
controlling display of the selected sample, the selected sample being read out on the basis of display control data reproduced with reference to the display control track and reproducing the selected sample with reference to the image management track.

* * * * *